(12) United States Patent
Guetta et al.

(10) Patent No.: US 11,106,692 B1
(45) Date of Patent: Aug. 31, 2021

(54) DATA RECORD RESOLUTION AND CORRELATION SYSTEM

(71) Applicant: Palantir Technologies Inc., Denver, CO (US)

(72) Inventors: Charles Guetta, New York, NY (US); Anuraag Bahl, New York, NY (US); Brandon Krieger, New York, NY (US); Christopher Walker, Palo Alto, CA (US); Daniel Campos, Washington, DC (US); Elisa Castaner, New York, NY (US); Samuel Tarng, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 837 days.

(21) Appl. No.: 15/667,413

(22) Filed: Aug. 2, 2017

Related U.S. Application Data

(60) Provisional application No. 62/371,082, filed on Aug. 4, 2016.

(51) Int. Cl.
*G06F 16/20* (2019.01)
*G06F 16/248* (2019.01)
(Continued)

(52) U.S. Cl.
CPC ........ *G06F 16/248* (2019.01); *G06F 16/2468* (2019.01); *G06F 16/287* (2019.01)

(58) Field of Classification Search
CPC .. G06F 16/288; G06F 16/248; G06F 16/2468; G06F 16/287
See application file for complete search history.

(56) References Cited

U.S. PATENT DOCUMENTS 5,826,021 A 10/1998 Mastors et al.
5,832,218 A 11/1998 Gibbs et al.
(Continued)

FOREIGN PATENT DOCUMENTS

CN 102054015 5/2014
DE 102014204827 9/2014
(Continued)

OTHER PUBLICATIONS

"A Tour of Pinboard," <http://pinboard.in/tour> as printed May 15, 2014 in 6 pages.
(Continued)

*Primary Examiner* — Tarek Chbouki
(74) *Attorney, Agent, or Firm* — Knobbe, Martens, Olson & Bear, LLP

(57) ABSTRACT

Methods, systems and apparatus, including computer programs encoded on computer storage media for a data record resolution and correlation system. One of the methods includes obtaining data sets each including records associated with entities, the records each specifying information for a plurality of aspects of an entity, the information being encoded in the records, for each of the data sets, according to a respective format. One or more bundles are determined from the data sets, with each bundle indicating records determined to be associated with a same entity and determined using similarity rules that compare aspects specified in the records. Information describing a particular bundle is presented to a reviewing user, and the reviewing user can specify one or more records included in the particular bundle that are properly matched. The particular bundle can be updated based on the reviewing user's specification.

20 Claims, 11 Drawing Sheets

(51) Int. Cl.
*G06F 16/28* (2019.01)
*G06F 16/2458* (2019.01)

(56) References Cited

U.S. PATENT DOCUMENTS

| | | |
|---|---|---|
| 5,878,434 A | 3/1999 | Draper et al. |
| 5,897,636 A | 4/1999 | Kaeser |
| 5,966,706 A | 10/1999 | Biliris et al. |
| 5,978,475 A | 11/1999 | Schneier et al. |
| 6,006,242 A | 12/1999 | Poole et al. |
| 6,057,757 A | 5/2000 | Arrowsmith et al. |
| 6,134,582 A | 10/2000 | Kennedy |
| 6,243,717 B1 | 6/2001 | Gordon et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,725,240 B1 | 4/2004 | Asad et al. |
| 7,017,046 B2 | 3/2006 | Doyle et al. |
| 7,058,648 B1 | 6/2006 | Lightfoot et al. |
| 7,089,541 B2 | 8/2006 | Ungar |
| 7,117,430 B2 | 10/2006 | Maguire et al. |
| 7,403,942 B1 | 7/2008 | Bayliss |
| 7,461,158 B2 | 12/2008 | Rider et al. |
| 7,627,489 B2 | 12/2009 | Schaeffer et al. |
| 7,725,842 B2 * | 5/2010 | Bronkema ......... G09B 19/0092 715/866 |
| 7,739,246 B2 | 6/2010 | Mooney et al. |
| 7,757,220 B2 | 7/2010 | Griffith et al. |
| 7,770,032 B2 | 8/2010 | Nesta et al. |
| 7,801,871 B2 | 9/2010 | Gosnell |
| 7,877,421 B2 | 1/2011 | Berger et al. |
| 7,912,842 B1 | 3/2011 | Bayliss |
| 7,962,495 B2 | 6/2011 | Jain et al. |
| 8,117,022 B2 | 2/2012 | Linker |
| 8,126,848 B2 | 2/2012 | Wagner |
| 8,190,893 B2 | 5/2012 | Benson et al. |
| 8,290,838 B1 | 10/2012 | Thakur et al. |
| 8,302,855 B2 | 11/2012 | Ma et al. |
| 8,364,642 B1 | 1/2013 | Garrod |
| 8,386,377 B1 | 2/2013 | Xiong et al. |
| 8,417,715 B1 | 4/2013 | Bruckhaus et al. |
| 8,429,527 B1 | 4/2013 | Arbogast |
| 8,554,719 B2 | 10/2013 | McGrew |
| 8,601,326 B1 | 12/2013 | Kirn |
| 8,639,552 B1 | 1/2014 | Chen et al. |
| 8,688,573 B1 | 4/2014 | Ruknoic et al. |
| 8,812,444 B2 | 8/2014 | Garrod et al. |
| 8,838,538 B1 | 9/2014 | Landau et al. |
| 8,903,717 B2 | 12/2014 | Elliot |
| 8,924,388 B2 | 12/2014 | Elliot et al. |
| 8,924,389 B2 | 12/2014 | Elliot et al. |
| 8,938,434 B2 | 1/2015 | Jain et al. |
| 8,938,686 B1 | 1/2015 | Erenrich et al. |
| 9,105,000 B1 | 8/2015 | White et al. |
| 9,230,060 B2 | 1/2016 | Friedlander et al. |
| 9,286,373 B2 | 3/2016 | Elliot et al. |
| 9,348,851 B2 | 5/2016 | Kirn |
| 2002/0035590 A1 | 3/2002 | Eibach et al. |
| 2002/0095360 A1 | 7/2002 | Joao |
| 2002/0103705 A1 | 8/2002 | Brady |
| 2002/0112157 A1 | 8/2002 | Doyle et al. |
| 2002/0194058 A1 | 12/2002 | Eldering |
| 2003/0088438 A1 | 5/2003 | Maughan et al. |
| 2003/0093401 A1 | 5/2003 | Czahkowski et al. |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0171942 A1 | 9/2003 | Gaito |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0083466 A1 | 4/2004 | Dapp et al. |
| 2004/0088177 A1 | 5/2004 | Travis et al. |
| 2004/0117387 A1 | 6/2004 | Civetta et al. |
| 2004/0153451 A1 | 8/2004 | Phillips et al. |
| 2004/0210763 A1 | 10/2004 | Jonas |
| 2004/0236688 A1 | 11/2004 | Bozeman |
| 2005/0010472 A1 | 1/2005 | Quatse et al. |
| 2005/0097441 A1 | 5/2005 | Herbach et al. |
| 2005/0102328 A1 | 5/2005 | Ring et al. |
| 2005/0131935 A1 | 6/2005 | O'Leary et al. |
| 2005/0262493 A1 | 11/2005 | Schmidt et al. |
| 2005/0262512 A1 | 11/2005 | Schmidt et al. |
| 2006/0010130 A1 | 1/2006 | Leff et al. |
| 2006/0080283 A1 | 4/2006 | Shipman |
| 2006/0080316 A1 | 4/2006 | Gilmore et al. |
| 2006/0143075 A1 | 6/2006 | Carr et al. |
| 2006/0161558 A1 | 7/2006 | Tamma et al. |
| 2006/0178954 A1 | 8/2006 | Thukral et al. |
| 2006/0209085 A1 | 9/2006 | Wong et al. |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2007/0000999 A1 | 1/2007 | Kubo et al. |
| 2007/0067285 A1 | 3/2007 | Blume |
| 2007/0162454 A1 | 7/2007 | D'Albora et al. |
| 2007/0178501 A1 | 8/2007 | Rabinowitz et al. |
| 2007/0192122 A1 | 8/2007 | Routson et al. |
| 2007/0233756 A1 | 10/2007 | D'Souza et al. |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0104407 A1 | 5/2008 | Horne et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0168054 A1 | 7/2008 | Lee et al. |
| 2008/0195672 A1 | 8/2008 | Hamel et al. |
| 2008/0201580 A1 | 8/2008 | Savitzky et al. |
| 2008/0208735 A1 | 8/2008 | Balet et al. |
| 2008/0228467 A1 | 9/2008 | Womack et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0313132 A1 | 12/2008 | Hao et al. |
| 2009/0006394 A1 * | 1/2009 | Snapp ................. G06F 16/2468 |
| 2009/0020284 A1 * | 1/2009 | Graf ....................... E21B 44/00 166/250.15 |
| 2009/0055487 A1 | 2/2009 | Moraes et al. |
| 2009/0094270 A1 | 4/2009 | Alirez et al. |
| 2009/0106178 A1 | 4/2009 | Chu |
| 2009/0106242 A1 | 4/2009 | McGrew |
| 2009/0112745 A1 | 4/2009 | Stefanescu |
| 2009/0157732 A1 | 6/2009 | Hao et al. |
| 2009/0164387 A1 | 6/2009 | Armstrong et al. |
| 2009/0187546 A1 | 7/2009 | Whyte et al. |
| 2009/0228507 A1 | 9/2009 | Jain et al. |
| 2009/0228701 A1 | 9/2009 | Lin |
| 2009/0249244 A1 | 10/2009 | Robinson et al. |
| 2009/0271343 A1 | 10/2009 | Vaiciulis et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0125470 A1 | 5/2010 | Chisholm |
| 2010/0145909 A1 | 6/2010 | Ngo |
| 2010/0204983 A1 | 8/2010 | Chung et al. |
| 2010/0211550 A1 | 8/2010 | Daniello et al. |
| 2010/0306285 A1 | 12/2010 | Shah et al. |
| 2011/0060910 A1 | 3/2011 | Gormish et al. |

(56) References Cited

U.S. PATENT DOCUMENTS

| | | | |
|---|---|---|---|
| 2011/0066497 A1 | 3/2011 | Gopinath et al. | |
| 2011/0093327 A1 | 4/2011 | Fordyce, III et al. | |
| 2011/0099133 A1 | 4/2011 | Chang et al. | |
| 2011/0131547 A1 | 6/2011 | Elaasar | |
| 2011/0173093 A1 | 7/2011 | Psota et al. | |
| 2011/0208565 A1 | 8/2011 | Ross et al. | |
| 2011/0208822 A1 | 8/2011 | Rathod | |
| 2011/0238408 A1 | 9/2011 | Larcheveque et al. | |
| 2011/0252282 A1 | 10/2011 | Meek et al. | |
| 2011/0258216 A1 | 10/2011 | Supakkul et al. | |
| 2012/0013684 A1 | 1/2012 | Robertson et al. | |
| 2012/0022945 A1 | 1/2012 | Falkenborg et al. | |
| 2012/0059853 A1 | 3/2012 | Jagota | |
| 2012/0078595 A1 | 3/2012 | Balandin et al. | |
| 2012/0084287 A1 | 4/2012 | Lakshminarayan et al. | |
| 2012/0150860 A1 | 6/2012 | Bhamidipati et al. | |
| 2012/0191446 A1 | 7/2012 | Binsztok et al. | |
| 2012/0215784 A1 | 8/2012 | King et al. | |
| 2012/0290879 A1 | 11/2012 | Shibuya et al. | |
| 2013/0006947 A1 | 1/2013 | Akinyemi et al. | |
| 2013/0016106 A1 | 1/2013 | Yip et al. | |
| 2013/0091084 A1 | 4/2013 | Lee | |
| 2013/0096968 A1 | 4/2013 | Van Pelt et al. | |
| 2013/0097130 A1 | 4/2013 | Bingol et al. | |
| 2013/0124193 A1 | 5/2013 | Holmberg | |
| 2013/0124525 A1* | 5/2013 | Anderson | G06F 16/285 707/737 |
| 2013/0132348 A1 | 5/2013 | Garrod | |
| 2013/0151453 A1 | 6/2013 | Bhanot et al. | |
| 2013/0166480 A1 | 6/2013 | Popescu et al. | |
| 2013/0198565 A1 | 8/2013 | Mancoridis et al. | |
| 2013/0226879 A1 | 8/2013 | Talukder et al. | |
| 2013/0226944 A1 | 8/2013 | Baid et al. | |
| 2013/0246316 A1 | 9/2013 | Zhao et al. | |
| 2013/0263019 A1 | 10/2013 | Castellanos et al. | |
| 2013/0290092 A1* | 10/2013 | Basu | G06Q 30/02 705/14.42 |
| 2014/0006404 A1 | 1/2014 | McGrew et al. | |
| 2014/0032556 A1 | 1/2014 | Bayliss | |
| 2014/0108074 A1 | 4/2014 | Miller et al. | |
| 2014/0222793 A1 | 8/2014 | Sadkin et al. | |
| 2014/0279299 A1 | 9/2014 | Erenrich | |
| 2014/0297640 A1 | 10/2014 | Duftler et al. | |
| 2014/0358829 A1 | 12/2014 | Hurwitz | |
| 2015/0012509 A1 | 1/2015 | Kirn | |
| 2015/0046481 A1 | 2/2015 | Elliot | |
| 2015/0106379 A1 | 4/2015 | Elliot et al. | |
| 2015/0188715 A1 | 7/2015 | Castelluci et al. | |
| 2016/0154859 A1* | 6/2016 | Skurtovich, Jr. | G06Q 40/02 707/737 |
| 2017/0052958 A1 | 2/2017 | Manning et al. | |
| 2017/0091320 A1* | 3/2017 | Psota | G06F 16/35 |
| 2017/0177645 A1* | 6/2017 | Basu | G06Q 30/02 |
| 2017/0270181 A1* | 9/2017 | Lindner | G06F 16/285 |

FOREIGN PATENT DOCUMENTS

| | | |
|---|---|---|
| DE | 102014204830 | 9/2014 |
| DE | 102014204834 | 9/2014 |
| DE | 102014213036 | 1/2015 |
| EP | 1566758 | 8/2005 |
| EP | 1962222 | 8/2008 |
| EP | 2487610 | 8/2012 |
| EP | 2551799 | 1/2013 |
| EP | 2778913 | 9/2014 |
| EP | 2778914 | 9/2014 |
| EP | 2897051 | 7/2015 |
| EP | 3133511 | 1/2017 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2005/010685 | 2/2005 |
| WO | WO 2009/051987 | 4/2009 |
| WO | WO 2010/030919 | 3/2010 |
| WO | WO 2011/017289 | 5/2011 |
| WO | WO 2011/071833 | 6/2011 |
| WO | WO 2012/079836 | 6/2012 |
| WO | WO 2013/067077 | 5/2013 |

OTHER PUBLICATIONS

Anonymous, "A Real-World Problem of Matching Records," Nov. 2006, <http://grupoweb.upf.es/bd-web/slides/ullman.pdf> pp. 1-16.

Bhattacharya et al., "Collective Entity Resolution in Relational Data," ACM Transactions on Knowledge Discovery from Data (TKDD, Association for Computing Machinery, Inc., vol. 1, No. 1, Mar. 1, 2007, pp. 5-es.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

Chaudhuri et al., "An Overview of Business Intelligence Technology," Communications of the ACM, Aug. 2011, vol. 54, No. 8.

Delicious, <http://delicious.com/> as printed May 15, 2014 in 1 page.

Draisbach et al., "A Comparison and Generalization of Blocking and Windowing Algorithm for Duplicate Detection," Aug. 24, 2009, retrieved from https://hpi.de/fileadmin/user_upload/fachgebiete/naumann/publication/2009/QDB09_crc.pdf.

Elmagarmid et al., "Duplicate Record Detection: A Survey," IEEE Transactions on Knowledge and Data Engineering, IEEE Service Center, Los Alamitos, California, US, vol. 19, No. 1, Jan. 1, 2007, pp. 1-16.

"E-MailRelay," <http://web.archive.org/web/20080821175021/http://emailrelay.sourceforge.net/> Aug. 21, 2008, pp. 2.

Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.

Getoor et al., "Entity Resolution for Big Data," Aug. 11, 2013, retrieved from http://www.umiacs.umd.edu/~geotoor/Tutorials/ER_KDD2013.pdf.

Gu et al., "Record Linkage: Current Practice and Future Directions," Jan. 15, 2004, pp. 32.

Hua et al., "A Multi-attribute Data Structure with Parallel Bloom Filters for Network Services", HiPC 2006, LNCS 4297, pp. 277-288, 2006.

Johnson, Maggie "Introduction to YACC and Bison", Handout 13, Jul. 8, 2005, in 11 pages.

Johnson, Steve, "Access 2013 on demand," Access 2013 on Demand, May 9, 2013, Que Publishing.

Kardes et al., "Graph-based Approaches for Organization Entity Resolution in MapReduce," Proceedings of the TextGraphs-8 Workshop, Oct. 18, 2013, pp. 70-78.

Kopcke et al., "Frameworks for Entity Matching: A Comparison," Data & Knowledge Engineering, vol. 69, No. 2, Feb. 1, 2010, pp. 197-210.

Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Ma et al., "A New Approach to Secure Logging," ACM Transactions on Storage, vol. 5, No. 1, Article 2, Published Mar. 2009, 21 pages.

Nadeau et al., "A Survey of Named Entity Recognition and Classification," Jan. 15, 2004, pp. 20.

Nin et al., "On the Use of Semantic Blocking Techniques for Data Cleansing and Integration," 11th International Database Engineering and Applications Symposium, 2007, pp. 9.

(56) References Cited

OTHER PUBLICATIONS

Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh Usenix Security Symposium Proceedings, USENIX Press, Jan. 1998, pp. 53-62, https://www.schneier.com/paper-secure-logs.pdf.
Sekine et al., "Definition, Dictionaries and Tagger for Extended Named Entity Hierarchy," May 2004, pp. 1977-1980.
Wang et al., "Research on a Clustering Data De-Duplication Mechanism Based on Bloom Filter," IEEE 2010, 5 pages.
Waters et al., "Building an Encrypted and Searchable Audit Log," Published Jan. 9, 2004, 11 pages, http://www.parc.com/content/attachments/building_encrypted_searchable_5059_parc.pdf.
Wikipedia, "Multimap," Jan. 1, 2013, https://en.wikipedia.org/w/index.php?title=Multimap&oldid=530800748.
Wikipedia, "Record Linkage," May 9, 2015, retrieved from https://web.archive.org/web/20150509130215/http://en.wikipedia.org/wiki/Record_Linkage.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Notice of Allowance for U.S. Appl. No. 12/556,307 dated Jan. 4, 2016.
Notice of Allowance for U.S. Appl. No. 14/094,418 dated Jan. 25, 2016.
Notice of Allowance for U.S. Appl. No. 14/223,918 dated Jan. 6, 2016.
Notice of Allowance for U.S. Appl. No. 14/304,741 dated Apr. 7, 2015.
Notice of Allowance for U.S. Appl. No. 14/552,336 dated Nov. 3, 2015.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014203669 dated May 29, 2015.
Official Communication for European Patent Application No. 09813700.3 dated Apr. 3, 2014.
Official Communication for European Patent Application No. 14158958.0 dated Apr. 16, 2015.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Apr. 16, 2015.
Official Communication for European Patent Application No. 14199180.2 dated Jun. 22, 2015.
Official Communication for European Patent Application No. 14199180.2 dated Aug. 31, 2015.
Official Communication for European Patent Application No. 16184820.5 dated Jan. 3, 2017.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1411984.6 dated Dec. 22, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for Netherlands Patent Application No. 2013134 dated Apr. 20, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 627061 dated Jul. 14, 2014.
Official Communication for New Zealand Patent Application No. 628161 dated Aug. 25, 2014.
Official Communication for U.S. Appl. No. 12/556,307 dated Oct. 1, 2013.
Official Communication for U.S. Appl. No. 12/556,307 dated Feb. 13, 2012.
Official Communication for U.S. Appl. No. 12/556,307 dated Mar. 14, 2014.
Official Communication for U.S. Appl. No. 12/556,307 dated Sep. 2, 2011.
Official Communication for U.S. Appl. No. 12/556,307 dated Jun. 9, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/014,313 dated Jun. 18, 2015.
Official Communication for U.S. Appl. No. 14/014,313 dated Feb. 26, 2016.
Official Communication for U.S. Appl. No. 14/223,918 dated Jun. 8, 2015.
Official Communication for U.S. Appl. No. 14/304,741 dated Mar. 3, 2015.
Official Communication for U.S. Appl. No. 14/304,741 dated Aug. 6, 2014.
Official Communication for U.S. Appl. No. 14/552,336 dated Jul. 20, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/800,447 dated Dec. 10, 2015.

(56) References Cited

OTHER PUBLICATIONS

Official Communication for U.S. Appl. No. 14/800,447 dated Mar. 3, 2016.
Official Communication for U.S. Appl. No. 15/233,149 dated Apr. 21, 2017.
Official Communication for U.S. Appl. No. 15/233,149 dated Aug. 25, 2017.

* cited by examiner

MAIN DASHBOARD    MATCHING TOOL    STATUS    REPORTS
                                   502

| Needs Further Review | Completed | Unmatchable | Unreviewed 504 |

| Assigned Reviewer ⬇ | | | 🗓 Pick a date... |

506 ➔

| Match Id ⇅ | Num Entries ⇅ | Assigned Reviewer ⇅ | Sources 508 ⇅ | Edit ⇅ |
|---|---|---|---|---|
| ☐ 1 | 3 | | | Edit |
| ☐ 2 | 2 | | | Edit |
| ☐ 3 | 2 | | | Edit |
| ☐ 4 | 2 | | | Edit |
| ☐ 5 | 2 | | | Edit |
| ☐ 6 | 2 | | Data Sets from which | Edit |
| ☐ 7 | 2 | | Records were Obtained | Edit |
| ☐ 8 | 2 | | | Edit |
| ☐ 9 | 3 | | | Edit |
| ☐ 10 | 4 | | | Edit |
| ☐ 10 | 4 | | | Edit |
| ☐ 11 | 2 | | | Edit |
| ☐ 12 | 3 | | | Edit |
| ☐ 13 | 2 | | | Edit |
| ☐ 13 | 1 | | | Edit |
| ☐ 14 | 2 | | | Edit |
| ☐ 15 | 5 | | | Edit |
| ☐ 16 | 2 | | | Edit |

Showing 1 to 20 of 1000 entries                Previous [1] 2 3 4 5 .... 50 Next

FIG. 5

RAW DATA VIEW

MATCH ID: 1

| Data Set 1 | |
|---|---|
| Data Set ID 1 | ID-1 |
| Data Set ID 2 | |
| Data Set ID 3 | |
| ID 4 | N/A |
| First Name | First Name |
| Last Name | Last Name |
| Business Name | |
| SSN | SSN |
| Email Address | johndoe@xxx.com |
| Business Email Address | johne@work.com |
| Phone Number | 123-456-7890 |
| Business Phone Number | 123-456-7890 |
| Business EIN | |
| DOB | Date of Birth |
| Address | Address street |
| City | City |
| State | State |
| Zip | Zip |
| Country | USA |
| Superior | 0 |
| Type | Type 1 |
| Category | Category 1 |
| Status | Status 1 |
| Amount | Amount 1 |
| Zone | Zone 1 |
| Queue Name | Name 1 |
| Flag | 0 |
| Industry Juice | Industry 1 |
| Program type | |
| Status | Status 1 |

Data Set 1 902

| | |
|---|---|
| Last Name | Last Name |
| First Name | First Name |
| Category | Category 1 |
| Address | Address street |
| City | City |
| State | State |
| Zip | |
| Data Set 1 ID | ID |
| Data Set 3 ID | |
| SSN | SSN |

Data Set 1

Data Set 2 904

| | |
|---|---|
| Full Name | Full Name |
| Last Name | Last Name |
| First/Business Name | First Name |
| Middle/Middle Name | |
| Street Address | Address street |
| City | City |
| State | State |
| Zip Code | Zip |
| Data Set 2 ID | ID |
| Data Set 3 ID | |

Data Set 2

Data Set 3 906

| | |
|---|---|
| Last Name | Last Name |
| First Name | First Name |
| Middle Name | Middle Name |
| Name Address 1 | Address street |
| City | City |
| State | State |
| Zip 5 | Zip |
| Data Set 3 ID | ID |
| SSN EIN | SSN |

Data Set 3

DATA RECORD RESOLUTION AND CORRELATION SYSTEM

CROSS-REFERENCE TO RELATED APPLICATIONS

This applications claims priority to U.S. Prov. Patent Appl. No. 62/371,082 titled "DATA RECORD RESOLUTION AND CORRELATION SYSTEM" and filed Aug. 4, 2016, which is hereby incorporated by reference in its entirety.

Any and all applications for which a foreign or domestic priority claim is identified in the Application Data Sheet as filed with the present application are hereby incorporated by reference in their entirety under 37 CFR 1.57.

BACKGROUND

In the normal course of operation of many businesses, electronic records can be recorded by employees that describe interactions with customers or other people associated with the businesses. For instance, a cable company may specify each time a customer calls about their cable subscription. Similarly, a medical insurance company may record hospital visits, dentist office visits, and so on. As the electronic records expand in size, or are transferred around as companies merged, get bought out, and so on, large data sets can be maintained with no clear link between them. That is, an electronic record in a first data set may be associated with a same person as an electronic record in a second data set, but the person's name may be entered slightly differently—or his/her address might be different due to relocation. Furthermore, the person's name may include a middle name in the first data set, and no middle name in the second data set. Ambiguities may arise due to the first data set potentially including less descriptive information than the second data set. For example, the first data set may specify the person's name and address, while the second data set specifies name, address, and social security number. Due to misspellings in name or address, it may be difficult to determine all electronic records in the first data set and second data set that are associated with the person.

SUMMARY

Particular embodiments of the subject matter described in this specification can be implemented so as to realize one or more of the following advantages. A system can access disparate data sets including hundreds, thousands, millions, of records associated with entities (e.g., businesses, individuals), and determine records that are associated with each entity. As will be described, the system can perform an exact matching process (e.g., the system can match records with the same name, address, zip code, social security number, and other identifying information) in combination with a fuzzy matching process (e.g., the system can match records with different identifying information, such as different, or incorrect, spellings of a name, different addresses, and so on). As an added assurance of the validity of the records determined to be associated with a same entity, the system can generate easy to understand user interfaces that describe the determined records for each entity. Upon review of a user interface describing records for a particular entity, the user can (1) confirm that the records are validly matched, (2) confirm that particular records are valid while others are invalid (e.g., not associated with the particular entity), or (3) confirm that the records are invalid.

Due to the complexity of performing both the exact matching and fuzzy matching processes, the system can advantageously limit the extent to which fuzzy matching is performed (e.g., fuzzy matching can be computationally expensive). That is, the system can ensure that fuzzy matching is not performed between records that are either known to match (e.g., name, address, social security number, exactly match between the records), or that are known not to match (e.g., social security number is different, name or address is different at greater than a threshold, and so on). Additionally, the system can limit an extent at which records are to be fuzzily matched with a particular record, for instance by limiting fuzzy matching to records with an exact name, address, or social security number, as the particular record. In this way fuzzy matching can be optimized to be performed a minimum number of times.

While limiting fuzzy matching can reduce processing time (e.g., reduce total power consumption, reduce database accesses and lookups, and so on), the system can further limit the extent to which false positives may crop up in the matching processes—reducing an amount of review time required to confirm the matched records. For example, the system can ensure that matches meet one or more similarity rules, which optionally may vary depending on specifics of a record being matched. For instance, a particular name identified in a record may be quite common (e.g., appear in records at greater than a threshold amount or percentage), and the system may ensure that records are not matched merely because they share the particular name (e.g., the system can also ensure that an address is the same, or substantially the same as with a fuzzy match, between the records). In contrast, a particular name that is uncommon (e.g., appears in records rarely, or is known to be unique) can be sufficient to match records that share the particular name.

In general, one innovative aspect of the subject matter described in this specification can be embodied in systems, computer readable media, and methods that include the actions of obtaining a plurality of data sets each including a plurality of records associated with entities, the records each specifying information for a plurality of aspects of an entity, wherein the information is encoded in the records, for each of the data sets, according to a respective format; determining one or more bundles from the plurality of data sets, each bundle indicating a plurality of records determined to be associated with a same entity, wherein the bundles are determined based on one or more similarity rules that compare one or more aspects specified in the records, and wherein the aspects are obtained using ontology associated with the data sets that enable access to the respective formats; providing, for presentation to a user, information associated with a particular bundle of the one or more bundles, the information describing the plurality of records indicated by the particular bundle; receiving, from the user, selections of one or more records of the plurality of records indicated by the particular bundle, the selections confirming that the one or more records are associated with the same entity; and updating the particular bundle based on the selections.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the one or more of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with one or more specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is an example user interface for confirming matched records in a particular bundle.

FIG. 5 illustrates an example user interface for viewing bundles that are to be reviewed.

FIG. 6 is an example user interface illustrating detailed information specified in a particular record.

FIG. 7 is an example user interface for confirming records in a bundle.

FIG. 8 is another example user interface for confirming records in a bundle.

FIG. 9 is an example user interface graphically representing records that have been confirmed to match.

FIG. 10 is an example user interface for confirming matched records in a particular bundle.

DETAILED DESCRIPTION

Figure 2:
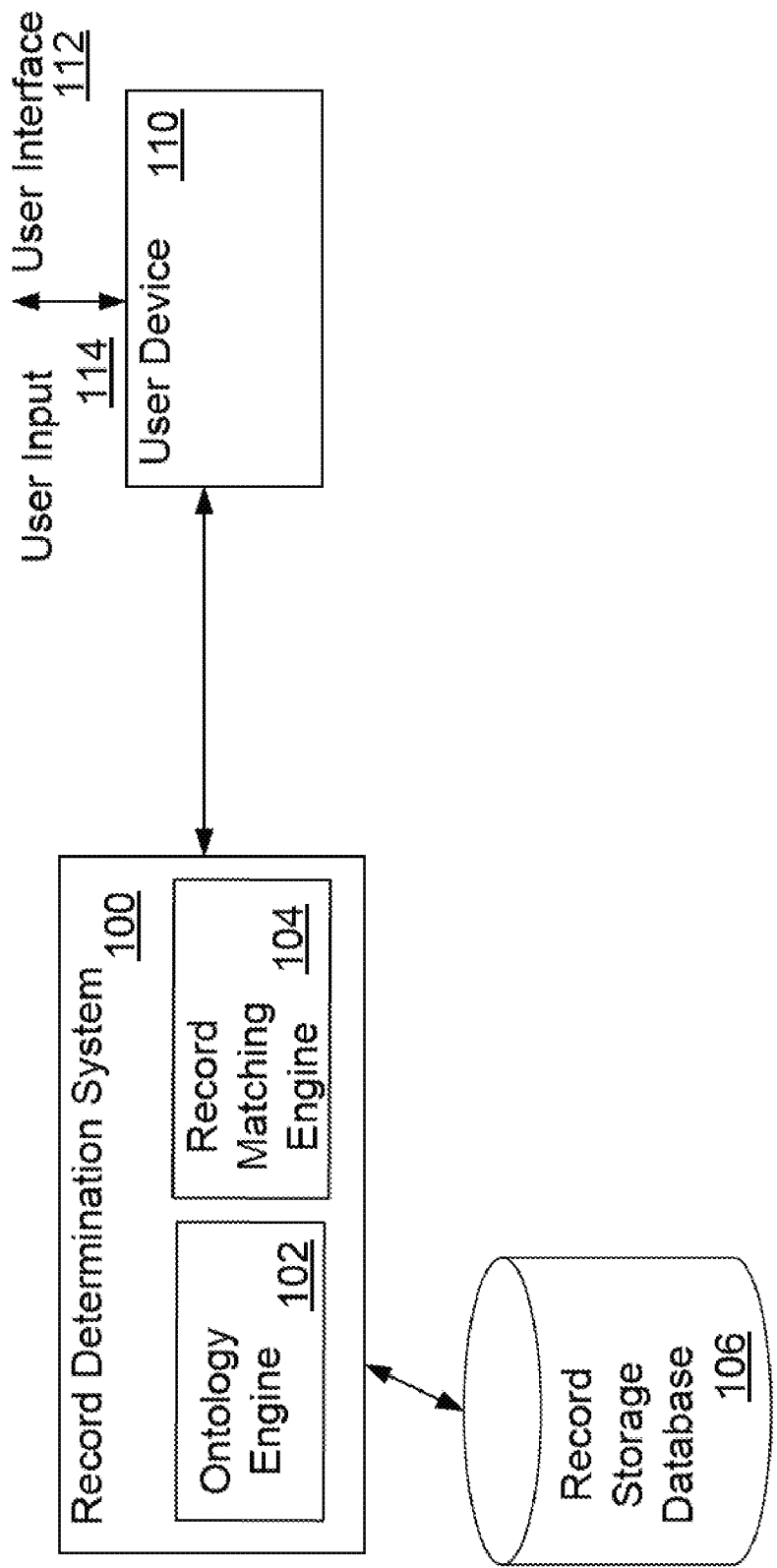
FIG. 2 is a block diagram of an example record determination system.

This specifications describes a system (e.g., the record determination system 100 described below) that can access large data sets storing, and/or or including, electronic records each associated with an entity (e.g., an individual, a business, an individual and a business), and can determine records stored across the data sets that are associated with each entity. For example, multiple records in each dataset may refer to a single entity, and the system can combine (e.g., de-duplicate) these records. As another example, records referring to a same entity may be stored in multiple data sets, and the system can unite these records as being matched to the same entity. In this specification, an electronic record (hereinafter referred to as a record) is any stored or maintained information specific to an entity and can include a particular row in a table of a database (e.g., relational database, non-relational database, object-relational database, spreadsheet, comma separated value file, and so on). Each record in a data set specifies particular aspects associated with an entity (e.g., identifying or otherwise uniquely descriptive of the entity), such as one or more of a name, address, phone number, social security number, name of familial relatives, name of an employer or associated business, address of an associated business, employer identification number (EIN) of an employer or associated business, email address, and so on. In the example of a table, each aspect can be specified by one or more columns of the table. For instance, an aspect can be associated with an entity's name, and the name may be specified in one or more columns of a table (e.g., first name in a particular column, last name in a subsequent column, or full name in a single column). In this specification, an aspect will be referred herein as particular information associated with an entity (e.g., a name, address, and so on), and also as the specific information referenced by the aspect (e.g., an entity's name, address, and so on).

As will be described, records in each data set may specify one or more of the same aspects as records in other data sets and/or may specify one or more different or unique aspects. For instance, records in a particular data set may specify names of entities as a first initial of a first name and full last name, while records in a different data set may specify names of entities as full first name, middle name, and last name. Similarly, records in a particular data set may specify name, address, social security number, while records in a different data set may specify name, address, and phone number. Optionally, particular records may each include multiple names, addresses, and so on.

Additionally, each data set may include records that specify aspects according to particular formats, which may optionally be distinct from other data sets. As an example, a first data set may include records that specify aspects according to a first format (e.g., first name, last name, address), while a second data set may include records that specify aspects according to a second format (e.g., full name, address). In the example, an entity's name is separated in the first format (e.g., distinct aspects, such as different columns in a table as described above), with the first name being specified separately than the second name, while an entity's full name is a single aspect in the second data set.

For ease of accessing particular aspects (e.g., an entity's full name), the system can generate and apply an ontology to each data set. As will be described, an ontology can be a structure, or mapping, defined for each data set that indicates how to access each aspect (e.g., a mapping between labels of one or more columns and a requested aspect). As an example of a particular data set, an ontology can indicate that to access an entity's name associated with a record, information associated with the entity's first name (e.g., a first column of a table at a row associated with the record) is to be combined with the entity's last name (e.g., a second column of the table at the row associated with the record). In general, an ontology includes any information, methods, processes, steps, that are to be applied to a data set to obtain a particular aspect from the data set. In this way, arbitrary data sets that include records with aspects encoded according to arbitrary formats can be accessed, and aspects from the records can be obtained and compared with each other regardless of data set, reducing the complexity involved in matching records. As will be described below, with respect to standardization processes of FIG. 3, the system can 'clean' aspects obtained from a data set. As an example with respect to a name, the system can remove white spaces, utilize a single letter from a middle name, convert characters to lowercase, and so on. In this way, the system can compare strings specifying first name, first letter of middle name, and last name, specified in records.

When matching records (e.g., matching all records that are associated with a same entity), the system utilizes one or more similarity rules that indicate whether two or more records are indicative of a match. As will be described, similarity rules can indicate particular aspects that are to be compared, and can require that one or more of the particular aspects (1) exactly match, or (2) fuzzily match. In this specification, a similarity rule associated with a fuzzy match is a method of identifying whether two or more records match (e.g., roughly match), and can be based on a likelihood that the two or more records are matches given their respective aspects and optionally a likelihood that the two or more records will match by chance. For instance, a similarity rule can be associated with a fuzzy match between names specified by records, and the system can compute a particular difference between the names specified in, for example, two records (e.g., a Levenshtein distance, representing the minimum number of single-character edits, such as insertions, deletions, or substitutions, required to change one name into the other name, a Demerau-Levenshtein distance, Hamming distance, and so on). The difference can be utilized to determine whether the names are indicative of a match (e.g., a likelihood that the names are the same is greater than a threshold), for instance due to the names being entered slightly incorrectly (e.g., by respective people that specified the two records). Other similarity rules associated with fuzzy matches can be utilized, for instance names (e.g., an individual's name, a businesses' name) can be compared using phonetic algorithms (e.g., the name Smythe may have been improperly specified as Smith, Graham as Gram, and so on).

In the example of the data sets being tables in databases, for each similarity rule associated with an exact match, the system can generate a similarity table that includes the aspects to be compared from each record. For instance, a similarity rule can be associated with comparing entities' names, and the system can generate a similarity table that includes, in respective rows, a name specified for each record and a unique identifier of the record. The system can then merge (e.g., join) the similarity table on itself (e.g., the names can function as a similarity key), and obtain a resulting table that specifies records whose specified names exactly match. Other similarity rules can be utilized, for instance similarity rules can compare entities' addresses, social security numbers, or can be a combination of multiple aspects (e.g., name, address, last four digits of social can be concatenated, and compared).

Optionally, each record can be associated with a type of entity, such as an individual, a business, or both an individual and a business. When matching records, the system can ensure that records of a particular type are matched with records of the same particular type. For instance, records indicated as being a business may not be matched with records indicated as being associated with an individual (e.g., the business Tommy Hilfiger will not be matched with records specifying individuals with a similar name). Optionally, each aspect can be associated with a type of entity. When comparing two records of type individual, the system can ensure that only aspects also associated with type individual are compared. As an example, the two records may each specify a name of an associated individual, while also specifying a name of a business the individual works at or owns. The system can ensure that the individual's names are compared when performing the matching process. Additionally, particular aspects may be associated with both an individual and a business, such as an address, and the system can match records of either individual, or business, using the specified addresses.

After utilizing similarity rules, the system can determine matches between records and generate bundles that associate matched records together. To confirm the accuracy of the matched records (e.g., remove false positives), the system can generate one or more user interfaces that describe each bundle, and a reviewing user can confirm whether each record in the bundle has been aptly assigned to the bundle.

Optionally, the system can receive new or updated information, such as updated (e.g., modified) or new similarity rules, new data sets, updated data sets (e.g., the data sets can be updated to specify additional information in each record), and so on. The system can rapidly incorporate the new or updated information while advantageously incorporating the matched records confirmed by the reviewing user. In this way, confirmation work performed by the reviewing user will not have to be repeated, and the matches can be refined, and increased in accuracy, as new or updated information is received by the system.

Figure 1:
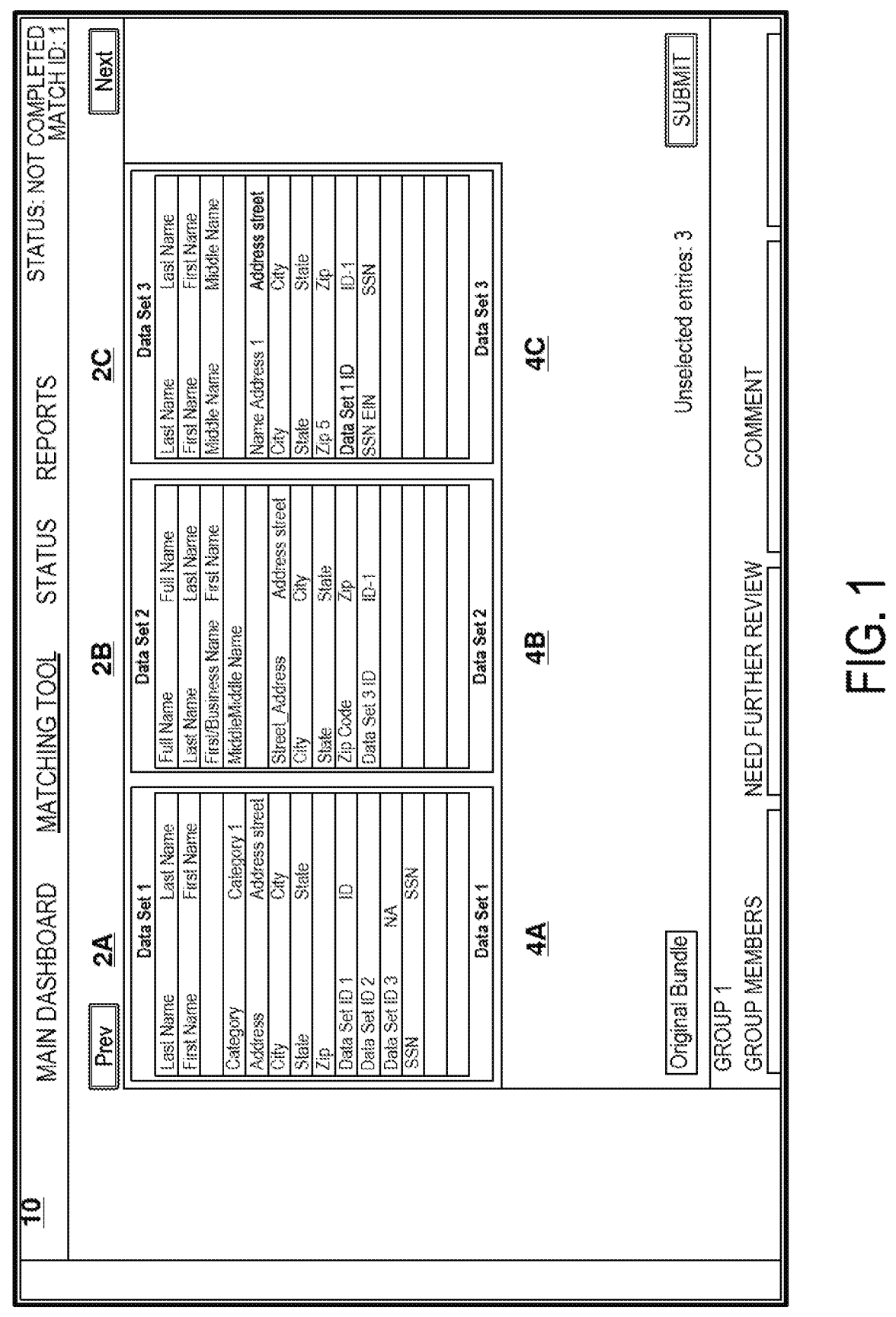

FIG. 1 is an example user interface 10 for confirming matched records in a particular bundle. The user interface 10 is an example of an interactive user interface that can be generated by a system (e.g., the record determination system 100 described below, or a presentation system in communication with the record determination system 100 that can receive information from the system 100), and presented via a display of the system or a user device (e.g., computer system, laptop, tablet, smart phone, wearable device). The user interface 10 can be accessible as an interactive document (e.g., a web page) on the user device received from the system, and the system can access, update, modify, one or more databases in response to user interactions received in the user interface 10.

As illustrated in the example user interface 10, three records (e.g., records 2A-2C) are graphically illustrated as belonging to the particular bundle determined by the system. Each record indicates a particular data set from which it was obtained (e.g., Data Set 1 4A, Data Set 2 4B, Data Set 3 4C), along with specifying aspects of a respective entity associated with the records. As illustrated, each record encodes information in a different format. For instance, record 2A specifies a last name, a first name, an address, and so on, of an entity. Similarly, record 2B specifies a full name, a last name, a first name, while record 2C specifies a last name, a first name, and a middle name. As will be described, an ontology can be utilized for each of the data sets 4A-4C, such that aspects can be compared across data sets. In the example of FIG. 1, the system can, using one or more ontologies, access a name specified in each record, such as for Record 2A (e.g., Last Name, First Name), Record 2B (e.g., Last Name, First Name) and Record 2C (e.g., Last Name, First Name+Middle Name).

Utilizing user interface 10, a reviewing user can quickly view the records determined to match. As will be described below, the reviewing user can confirm that the records match, or can cause one or more of the records to be removed from the particular bundle. As an example of removing a record, upon removal the record can be included in a group associated with unmatched records. At a later time, the record may be presented to the reviewing user and the reviewing user can manually match the record. Optionally, removing a record from the particular bundle can cause a splitting of the particular bundle in sub-groups. For example, records determined to match may indicate information associated with a husband and wife. A reviewing user can prefer splitting the records associated with the husband into a first sub-group, and the records associated with the wife into a second sub-group. Similarly, the reviewing user can include a particular record in a group by itself, indicating that this particular record is unmatched. Additionally, upon removal the record can be included in a group associated with an entity specified by the reviewing user. For example, the reviewing user can create a group associated with a husband and wife, or a group that combines records associated with an individual and a record identifying an associated business, and so on. In this way, records associated with either the husband or wife can be included in the same group. Furthermore, the reviewing user can interact with each record, and the user interface 10 can be updated to present more detailed information included in the record. As illustrated in FIG. 6, detailed information specified in the record can be presented, such that the reviewing user can ensure that the records should indeed be matched. The system can receive information indicating that the reviewing user confirmed at least a portion of the matched records, and can update one or more databases confirming the matches.

Optionally, the user interface 10 can indicate the information that matches between records. For example, the user interface can indicate that a name specified in record 2A matches with a name specified in record 2B. As an example of indicating, the names specified in the records 2A,2B, can be a same color (e.g., green), while a name specified in record 2C can be a different color if it does not match. Furthermore, as will be described below a fuzzy matching process can be performed to determine whether records roughly match (e.g., match at greater than a threshold likelihood). The user interface 10 can optionally indicate whether information exactly matches, for example whether the names in records 2A and 2B exactly match, or whether the information fuzzily matches. As an example of the names fuzzily matching, the user interface 10 can present information identifying a likelihood of the names matching. For instance, the user interface 10 can present a Levenshtein distance between the names, and so on as will be described.

Optionally, the user interface 10 can present information indicating that two or more of the records were previously confirmed to match by a reviewing user. As an example, record 2A and record 2B can be highlighted, colored, shaded, or otherwise identified (e.g., a textual message can be included in the user interface 10), specifying that the two records were confirmed to match. The reviewing user can then confirm whether the remaining record 2C matches with records 2A and 2B. As will be described, new or updated information can be received by the system, such as for instance a new data set for inclusion. When the new data set is received (e.g., data set 3 4C), the system can match records from the new data set with records in previously received data sets (e.g., data set 1 4A and data set 2 4B). Since the previously received data sets may have already been matched by a reviewing user, the system may have access to stored information indicating records that match. Therefore, the system can identify the matched records, and present another record (e.g., record 2C) for inclusion in the particular bundle.

The reviewing user can cycle through one or more other bundles, until exhausting the bundles determined by the system. Since the records have been matched by (1) the system, and (2) the reviewing user, the records can be trusted to a high degree while the work required by the reviewing user can be drastically lowered, and potentially only made by possible by the system as compared to the reviewing user reviewing records manually. Furthermore, the user can identify that two or more bundles are associated with a same entity. For example, as the reviewing user cycles through bundles, the reviewing user can specify that bundles not indicated as matching by the system are a match. The system can then merge these bundles, such that the bundles are associated with a same entity.

As the reviewing user cycles through the bundles, there may be remaining records that the reviewing user could not match. These records, for example 'singletons' that do not have a match, may remain in the bundles. Subsequently, these records can be presented to the reviewing user, and the reviewing user can manually indicate matching records. For example, the reviewing user can generate search queries and search through all records included in bundles. The matching records can then be merged with these remaining records. Additionally, as new records are obtained, these remaining records can be automatically analyzed to determine whether they match (e.g., roughly match) with the obtained records. The reviewing user can then be presented with potential matches, which the reviewing user can confirm as described herein.

FIG. 2 illustrates a block diagram of an example record determination system 100. The record determination system 100 can be a system of one or more computers (e.g., computers networked or otherwise in communication) or one or more virtual machines (e.g., a pool of virtual machines) executing on a system of one or more computers, that can access data sets and determine records, included in the data sets, which are associated with same entities (e.g., individuals, businesses). The record determination system 100 can communicate with, or maintain, one or more databases 106 or one or more storage subsystems that provide stored information to, and receive information from, the record determination system 100. As illustrated, the record determination system 100 is in communication with a user device 110, and can present user interfaces 112 for presentation on the user device 110. Optionally, the record determination system 100 can be in communication with a presentation system (e.g., a system of one or more computers) that can generate user interfaces, from information obtained or received from the record determination system 100, for presentation on the user device 110.

The database 106 (e.g., one or more databases) can store data sets that include records to be matched. As described above, during the normal course of business many businesses, governmental organizations, regulatory agencies, and so on, can generate records each associated with an entity (e.g., one or more of an individual, a business). The record determination system 100 can obtain the data sets from systems maintained by the businesses, governmental organizations, and so on, for storage in the database 106. As the data sets may be from disparate organizations, such as businesses, governmental organizations, information included in the records may be encoded in different formats.

To properly access information specified in the records, the record determination system 100 can utilize an ontology for each data set that enables access.

The record determination system 100 includes an ontology engine 102 that can generate, and apply, ontologies for use in accessing aspects of entities specified in records. Optionally, the ontology engine 102 can receive information (e.g., instructions) from a user and the ontology can be defined, at least in part, by the user. As an example, the user may review a data set, and determine that each aspect is encoded in the data set according to a particular format. The user may then, at least in part, define the ontology to access the aspects. Optionally, the ontology engine 102 can receive data sets, and analyze the data sets to determine commonalities between them (e.g., common aspects), and can define ontologies that enable access to the aspects. For instance, the ontology engine 102 can access label information associated with records in a particular data set (e.g., a table may include labels for each column). The ontology engine 102 can then compare the labels to stored information indicating likely aspects indicated by the labels (e.g., 'first name' likely indicates that the column is associated with a name aspect). Determining and defining ontologies are described in more detail below, with respect to FIG. 3. As an example of a defined ontology, a particular data set may include records organized in a table, and two of the columns of the table may specify a name associated with each record. The example ontology can therefore specify that, for the aspect of a name, the two columns are to be accessed. The ontology engine 102 can store each ontology, as an example, as information indicating a label of each aspect, and for each aspect a method, process, label (e.g., label or identifier of a column in a table) of obtaining the encoded information associated with the aspect.

As described above each record can be associated with a type of entity, such as an individual or a business. Similarly, the ontology layer can ensure that the proper information is utilized when comparing records. That is, the ontology layer can specify that, for a particular data set, a name of an individual is stored in a particular format (e.g., a particular column of a table, a particular element of a comma separated value file), while a name of a business is stored in a different format (e.g., a different column of a table). In this way, when the record determination system 100 matches records, the ontology layer can automatically ensure that the proper aspects are utilized during the matching (e.g., entities associated with individuals have the individuals' names utilized in the matching, while entities associated with businesses have the businesses' names utilized). Additionally, particular records may be associated with more than one type of entity (e.g., an individual and a business). The ontology layer can therefore indicate that a name associated with these particular records includes both the individuals' names and the businesses' names.

The record determination system 100 further includes a record matching engine 104 that can utilize the defined ontologies to access each data set, and determine records stored across the data sets that are associated with a same entity. As described above, the record matching engine 104 utilizes similarity rules to determine records that match, with each similarity rule utilizing one or more aspects, and determining whether the one or more aspects (1) exactly match, or (2) fuzzily match, between records. For instance, a similarity rule can compare a name and address, and the record matching engine 104 can determine records that exactly share the same name and address. In another instance, a similarity rule can compare only a name, or can compare name, address, and social security number (e.g., last four digits of each social security number). This latter rule is more likely to produce matches that are accurate, than the former rule of only comparing name. However, since errors associated with entering the information included in each record can increase an likelihood at which a name, address, or social security number, is misspelled or otherwise incorrect, the latter rule is likely to exclude potential matches (e.g., the latter rule may produce false negatives). Therefore, the record matching engine 104 can utilize a restrictive similarity rule, such as name, address, social security number, to initially identify matching records. Subsequently, the record matching engine 104 can utilize a less restrictive rule, for example determining records that share a same name, or share a same address, or share a same social security number, or share a same phone number, or share one or more other aspects. After determining the records, for example with a similarity rule associated with records specifying a same name, the record matching engine 104 can perform a fuzzy match on one or more remaining aspects, such as a fuzzy match on an address specified in the determined records.

A similarity rule associated with a fuzzy match, as described above, indicates that one or more aspects of records are to be matched depending on a distance from an exact match. For example, a fuzzy match can utilize a particular aspect of an entity, such as an address, and can compare addresses specified in records by determining, for instance, a Levenshtein distance between the addresses. For any records with a Levenshtein distance less than a threshold, the record matching engine 104 can optionally indicate that the records match. Additionally, as described above, the record matching engine 104 can initially determine records that satisfy one or more initial similarity rules that utilize exact matching, and then can utilize fuzzy matching on the determined records. In this way, the extent to which fuzzy matching is performed can be constrained, increasing processing time since fuzzy matching includes additional determinations and computations beyond exact matching.

The record matching engine 104 can compare records using the combinations of the above-described similarity rules, and obtain matches for each similarity rule. Optionally, a matching rule can specify which records are to be indicated as matched, for subsequent review by a reviewing user using one or more user interfaces (e.g., the user interface 10 described above, with respect to FIG. 1). For example, a matching rule can indicate that if a restrictive similarity rule (e.g., a similarity rule comparing multiple aspects, such as name, address, social security number, and requiring the multiple aspects to exactly match) matches two records, then the two records are to be considered a match. Additionally, a matching rule can indicate that if a threshold number of less restrictive matching rules, for instance a single aspect being compared and required to exactly match, are satisfied for two records (e.g., two or more of a name exactly matches, an address exactly matches, a social security exactly matches, a phone number exactly matches, an email address exactly matches, credit card numbers exactly match, and so on), then the two records match. As another example, a matching rule can indicate that if less than the threshold number of less restrictive matching rules are satisfied for two records (e.g., name exactly matches), then fuzzy matching can be performed on one or more remaining aspects. The matching rule can indicate that if a threshold number of the remaining aspects fuzzily match, then the two records match. For instance, if the name specified in two records exactly matches, the record matching engine 104 can perform fuzzy matching on addresses specified in the two records (e.g., or vice-versa).

Optionally, when the record matching engine 104 utilizes ontologies to access aspects encoded in records according to different formats, the record matching engine 104 can perform a standardization process on the aspects. For instance, the record matching engine 104 can remove all white spaces (e.g., a name, such as John Doe, can be obtained as JohnDoe), convert all characters to a same case (e.g., lower case), expand or contract abbreviations (e.g., jr. can become junior, st. can become street), remove or include a middle name (e.g., John C. Doe, can become either John Doe or remain John C. Doe, and both names can optionally be utilized when matching), punctuation can be removed, identifying numbers can be standardized (e.g., zip codes can be limited to a 5 digit zip code), and so on. As will be described further below with respect to FIG. 3, an ontology can specify the standardization processes. Particular aspects may be associated with one or more standardization processes, while other aspects may not be associated with standardization processes. As an example when comparing names, the engine 104 may concatenate first name and last name, and/or first name, middle name, last name. However, when comparing business names, the engine 104 may optionally not perform a standardization process.

After matches are indicated, the record matching engine 104 can generate bundles of matched records (e.g., the matched records can be associated with each other, with an identifier of a bundle, stored in a same table, and so on), and the record determination system 100, or a presentation system in communication with the system 100, can generate one or more user interfaces 112 describing each bundle. A reviewing user can access the user interfaces 112 and confirm determined matches for each bundle (e.g., the user interfaces 112 can receive user input 114). User interfaces are described above, with reference to FIG. 1, and below, with reference to FIGS. 5-10.

Additionally, after matches have been determined, and matched records associated with respective bundles, the record determination system 100 may receive additional information for inclusion in the database 10 (e.g., additional information specified in one or more records, such as middle names of entities, phone numbers, email addresses, and so on; or additional records), receive updated similarity rules, receive updated rules associated with an ontology (e.g., described below with respect to FIG. 3), receive information indicating that one or more records were corrected (e.g., updated), receive additional similarity rules, and so on.

For example, upon receiving additional or updated similarity rules, the record determination system 100 can cause any matches that have not been confirmed by a reviewing user to be unmatched, and can perform the matching process (e.g., as described above) utilizing the additional or updated similarity rules and/or received information. The system 100 can then group matched records, for example merging the records. As an example, a similarity rule can be updated to cause "Jr." and "Jr" to be equivalent (e.g., the period after "Jr" can be discarded when matching). This updated similarity rule can be utilized on unmatched records to identity potential matches. These potential matches may then be confirmed by reviewing users as described herein, and grouped (e.g., merged).

As another example, the record determination system 100 can obtain additional datasets that include records. The system 100 can utilize similarity rules, as described herein, to determine whether the included records match with other records. For example, the system 100 can determine whether the included records match with records of other datasets, and/or match with other included records. Advantageously, a newly included record may bring daylight into numerous records already stored, and/or maintained, by the system 100. As an example, a newly included dataset may be of high quality, and may include detailed records that are substantially accurate. For example, the records may include an entity's name, address, associated business, phone number, social security number, email address, and so on. If one or more other datasets stored by the system 100 include a subset of this information, for example a first example dataset may include name and address, while a second example dataset may include name and associated business, the system 100 may be unable to merge records between these two example data sets. However, with the inclusion of the new dataset, the system 100 may be able to match records included in the new dataset with the first example data set. For example, the system can match name and address between the first example data set and new data set. Additionally, the system 100 can further match records included in the new dataset with the second example data set. By virtue of these matches, the system 100 can determine that records between the first example dataset and second example data set similarly match. Therefore, including additional datasets can generate new matches not only between the new records and previously stored records, but also new matches between previously stored records. As described above, these matches may be presented to a reviewing user for confirmation, and upon confirmation can be grouped (e.g., merged).

The record determination system 100 can therefore generate updated bundles. For example, old bundles may be merged, new bundles created, and old bundles broken apart. An example of generating additional or updated bundles will be described. The system 100 can perform a record matching process, as described above, to generate bundles based, at least in part, on the received information (e.g., new records, new bundles, updated similarity rules, and so on as described above). For ease of description, bundles generated prior to receiving information are referred to herein as old bundle structures, and bundles generated subsequent to receiving information are referred to herein as new bundle structures. The system 100 can generate new bundle structures based on the received information, and these new bundle structures can be assumed to be correct by the system 100. Thus, these new bundle structures can be stored, for example for later review by a reviewing user. However, as described above, particular records may have previously been indicated as matching by the reviewing user. These reviewing user matches are assumed to take precedence over the new bundle structures, and the system 100 can update the new bundle structures as will be described below.

The new bundle structures can be associated with respective unique identifiers, which can be distinct from unique identifiers assigned to the old bundle structures. For example, if a largest unique identifier for the old bundle structures was a particular number (e.g., 999), the new bundle structures can begin at a next number (e.g., 1000).

These unique identifiers can optionally be categorical, not ordinal. The system 100 can compare the new bundle structures with the old bundle structures, and determine whether any of the bundles have identical content. For any determined new bundle structures that are identical to old bundle structures, the unique identifiers associated with the new bundle structures can be updated to be the same as the old bundle structures. However, if a new bundle structure includes a same set of records as an old bundle structure, but at least one record has been modified (e.g., updated, information included or deleted, and so on), the new bundle structure can retain its newly assigned unique identifier (e.g., not the old unique identifier).

For these new bundle structures with associated unique identifiers, the system 100 incorporates reviewing user information (e.g., matches previously performed by reviewing users). As an example, an old bundle structure may include records A, B, C, D, E, and F. Optionally, a reviewing user may have grouped these records as follows:

Group 1: A, B, C
Group 2: D, E
Group 3: F

The system 100 can utilize this reviewing user information to override particular new bundle structures. For example, if the system 100 has determined that records A and B do not match (e.g., a similarity rule may have been tightened), the system 100 can forcibly cause these two records to match (e.g., be included in a same new bundle structure) if a reviewing user previously indicated they match. That is, as illustrated above, records A and B were indicated as matching, and were included in Group 1.

However, if a new bundle structure indicates that records A, B, C, D, E, X, Y, and Z match, the system 100 can determine whether these records should be maintained in the new bundle structure. The system 100 can analyze the links between these records to determine whether the new bundle structure should be adjusted. For example, if the newly received information caused records C and D to match, the system 100 can separate the new bundle structure. That is, the system 100 can place records A, B, and C in a first bundle (e.g., same as Group 1 above) and D, E, X, Y, Z in a second bundle (e.g., a new Group 2). In this example, a reviewing user has previously indicated that records C and D do not match (e.g., as indicated in the groups above), and therefore the newly received information will be overridden by the system 100. However, optionally if other links are included, such as links between record A and X, then the system 100 can, in some implementations, maintain records A, B, C, D, E, X, Y, and Z, in the new bundle structure. Optionally, the system 100 can ensure that this new bundle structure is reviewed by a reviewing user.

The system 100 can present user interfaces for each of the new bundle structures indicating whether records were previously matched in old bundle structures. In this way, a reviewing user can rapidly view whether the new bundle structures are valid, and can update them as described above (e.g., remove records). Additionally, each bundle structure (e.g., new bundle structure or old bundle structure) can be traversed by the system 100 to identify bundles that need to be reviewed by a reviewing user. The system 100 can optionally identify that a bundle is to be reviewed if and only if the bundle has a new unique identifier (e.g., greater than 999 in the above example) or the bundle includes a record that was modified (e.g., as described above).

Figure 3:
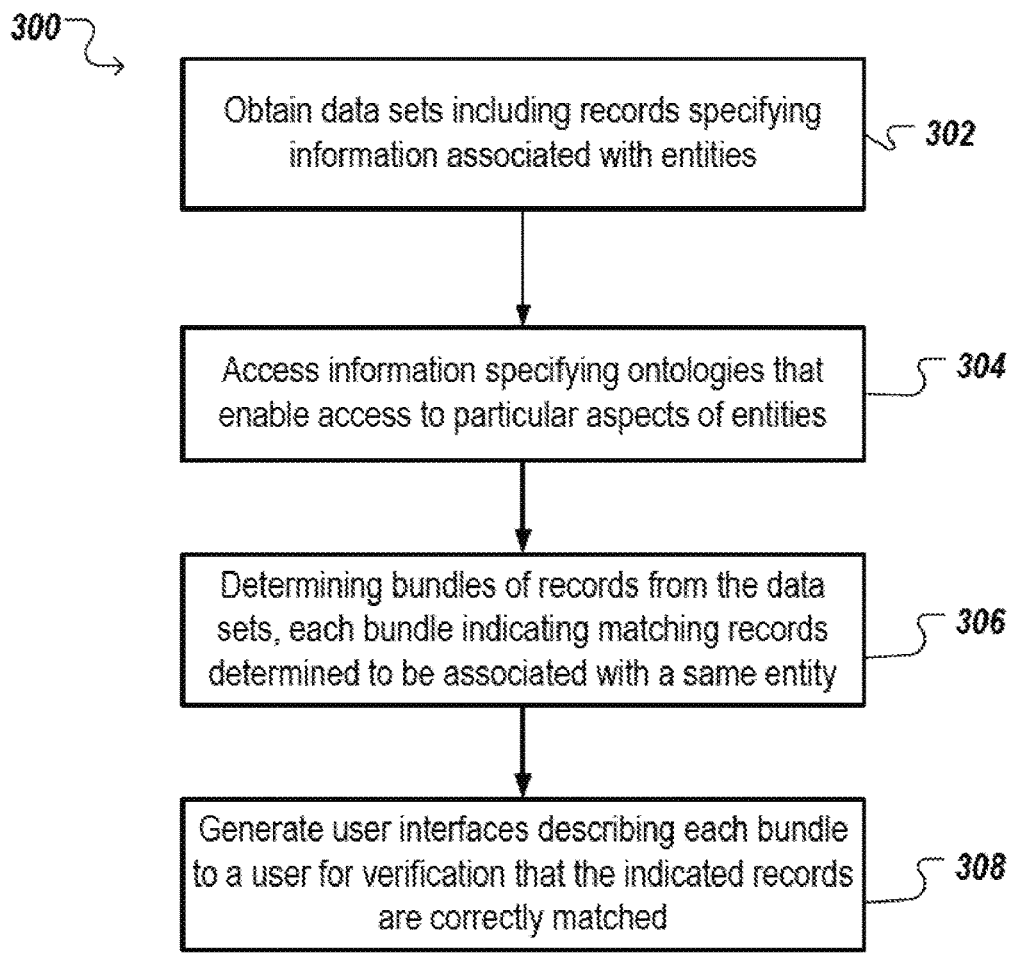
FIG. 3 is a flowchart of an example process for matching records included across data sets.

FIG. 3 is a flowchart of an example process 300 for matching records included across data sets. For convenience, the process 300 will be described as being performed by a system of one or more computers (e.g., the record determination engine 100).

The system obtains data sets including records specifying information associated with entities (block 302). As described above, large sets of records can be maintained by organizations (e.g., businesses, governmental organizations), and updated as new information comes in (e.g., contacts with individuals, businesses, and so on). The system can obtain these sets of records, herein referred to as data sets, and store the data sets for processing (e.g., stored in one or more databases). As described above, optionally the data sets can each be database tables, with rows of the tables referring to respective records, and columns of the tables referring to respective aspects (e.g., name, address, social security number, and so on). While the description below describes database tables, the data sets can be stored in other forms (e.g., comma separated value files, linked lists, and so on).

Optionally, each row of the table may be specific to a type of entity, such as an individual, business, or a combination of an individual and business. As an example, two rows in a table can include:

| ID | First Name | Middle Name | Last Name | Business Name | SSN | EIN | Address | Type |
|---|---|---|---|---|---|---|---|---|
| A1 | John | C. | Doe | Business1 | 123-45-6789 | 111-111-111 | Address1 | Individual |
| A2 | Nancy | M. | Doe | Business2 | 000-00-0000 | 555-555-5555 | Address2 | Business |

In the example row above, there are two records included (e.g., record A1 and A2), with a first record (e.g., record A1) being an individual type and a second record (e.g., A2) being a business type. As described above, and as will be described further below, when records are being matched the system can ensure that only records of a same type are matched together (e.g., a user can toggle this feature on or off). Additionally, when records are being matched, particular aspects can be utilized in the matching process depending on the type of records being matched. For example, when two business type records are being matched, the system can ensure that the records are being matched on their respective "Business Names," and not on any individual names specified in the records. As described below, the system can utilize one or more ontologies that enable access to aspects included in the records. For instance, an ontology for the above two rows can indicate that for the aspect of name, the system is to obtain information from the second, third, and fourth columns (e.g., first name, middle name, last name).

The system accesses information specifying ontologies that enable access to particular aspects of entities (block 304). As described above, different data sets may encode information in records differently, such as different column headings as shown below:

Data Set 1

| ID | First Name | Middle Name | Last Name | Business Name | SSN | EIN | Address | Type |
|----|------------|-------------|-----------|---------------|-----|-----|---------|------|
| A1 | John | C. | Doe | Business1 | 123-45-6789 | 111-111-111 | Address1 | Individual |
| A2 | Nancy | M. | Doe | Business2 | 000-00-0000 | 555-555-5555 | Address2 | Business |

Data Set 2

| ID | Name | Business Name | SSN | EIN | Address | Business Address | Type |
|----|------|---------------|-----|-----|---------|------------------|------|
| B1 | Emphrem Q. Name | Business3 | 987-65-11321 | 222-222-222 | Address3 | B_Address3 | Individual |
| B2 | Sally A. Identifier | Business4 | 000-00-0000 | 555-555-5555 | Address4 | B_Address4 | Individual |

As illustrated, Data Set 1 encodes information according to a first format (e.g., the aspect of Name is separated into multiple columns, and so on), while Data Set 2 encodes information according to a second format (e.g., the aspect of Name is a single column, and Data Set 2 includes both an individual address and a business address).

To simplify the comparing of records (e.g., performing similarity rules as described below), the system can utilize one or more ontologies that can be specific to each data set, and define methods, processes, labels, to access particular aspects. For example, an example ontology for Data Set 1 can indicate columns of the table that specify information associated with each aspect. That is, for the aspect of name associated with individuals:

{identifier: "A", aspect: "Name", first_name: "First Name", middle_name: "Middle Name", last_name: "Last Name", type of entity: "individual"}.

Similarly, for the aspect of name associated with businesses:

{identifier: "B", aspect: "Business Name", b_name: "Business Name", type of entity: "business"}

The ontology for Data Set 1 can then include the aspect of "name", and indicate that for business type records, the system is to utilize identifier "B", and as indicated, the system is to obtain information from column "Business Name." Similarly, the ontology can indicate that for individual type records, the system is to utilize identifier "A", and as indicated, the system is to obtain information from columns "First Name," "Middle Name," and "Last Name." When comparing records that include Data Set 1, the system can concatenate the first name, middle name, and last name, to obtain an encoded name of an entity.

The above can be repeated for Data Set 2 (e.g., an ontology can define that for the aspect of name, the system is to obtain an individual's full name from a single column). In this way, the system can easily access information associated with entities, enabling data sets to be compared regardless of format.

As described above, optionally the system can automatically determine ontologies for the data sets. For instance, the system can access label information (e.g., labels of columns), and can compare the label information to stored information indicating likely aspects the labels represent. In the example of Data Set 2, the system can determine that the label "Business Address" likely corresponds to an aspect of address for records of a business type. Additionally, for unlabeled information (e.g., a comma separated value '.csv' file may not include identifiers), the system can determine ontologies based on the particulars of the included information. For instance, the system can access information specifying common names, or a format commonly associated with a name (e.g., first name, last name; last name, first name; first name middle initial last name; and so on), and can determine that a particular element in a '.csv' file for each record (e.g., information included after a second comma) is associated with an aspect of name. Similarly, the system can utilize an outside system, such as a search system or search engine, and determine whether an address is associated with an individual address or a business address. For instance, the system can search a threshold number of addresses specified for a same element in multiple records (e.g., the address can be included after a 4$^{th}$ comma, and can be recognized by the use of street, road, or a general format of an address, and the system can search the multiple addresses), for instance in a property database, and can determine whether the addresses are associated with a business or individual. Other aspects can be determined similarly (e.g., the system can determine names corresponding to businesses, and so on).

The system determines bundles of matching records from the data sets (block 306). The system utilizes the ontologies (e.g., as described above) to match records. For instance, the system can compare a name specified in multiple records through use of the ontologies to obtain the names. As described above, the system determines matching records using similarity rules, that each compare particular aspects of records, and can require that aspects (1) exactly match or (2) fuzzily match, between records. For instance, a similarity rule can compare an aspect of name, and can identify that two records that specify a same name of "John C. Doe,"

exactly match, while a first record that specifies "John C. Doe," and a second record that specifies "Jon C. Doe" fuzzily match.

The system uses the similarity rules to determine records that match according to each similarity rule, and can then use a matching rule to determine which of the determined records are to be indicated as matching. For instance, and as will be described in more detail with respect to FIG. 4, the system can require that two records are matched by at least two similarity rules (e.g., the two records exactly share a same address and fuzzily share a same name, the two records fuzzily share a same address and name, and so on). The system includes each matching record in a respective bundle, for review by a reviewing user.

The system generates user interfaces describing each bundle (block 308). As will be described further below, with respect to FIGS. 5-10, a reviewing user can view information associated with each bundle (e.g., summary information of each record included in a bundle), and the user can confirm that records are correctly matched, or the user can modify the bundlings (e.g., remove a record from a bundle). The system stores the confirmed bundles for later presentation and use.

Optionally, the system can enable access to records included in the data sets, according to one or more filters specified by a user. For instance, the user can indicate that he/she is searching for a record that satisfies one or more filters, including particular aspect information (e.g., a particular name, address, and so on), is included in particular data sets, is included in particular bundles, and so on.

Figure 4:
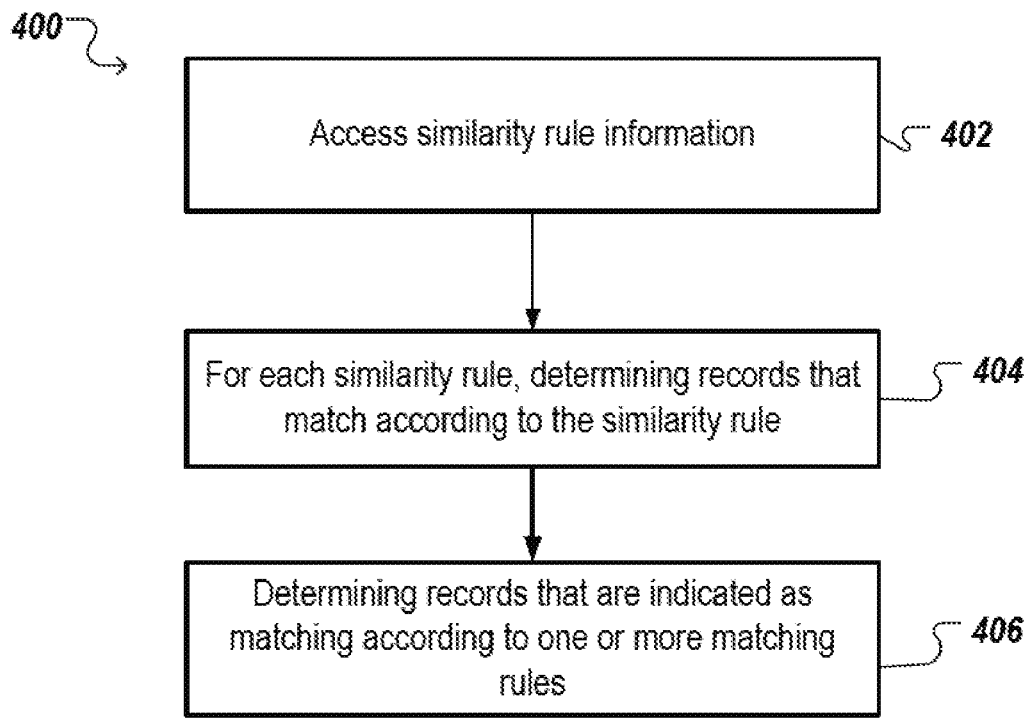
FIG. 4 is a flowchart of an example process for generating bundles of matched records.

FIG. 4 is a flowchart of an example process 400 for generating bundles of matched records. For convenience, the process 400 will be described as being performed by a system of one or more computers (e.g., the record determination system 100).

The system access similarity rule information (block 402). The system can store, or receive (e.g., from a user), information describing one or more similarity rules that are to be used in determining records associated with a same entity. Each similarity rule can be associated with a particular identifier (e.g., name_similarity, can indicate that the similarity rule matches records that specify same names), and can specify aspects that are to be compared (e.g., name_similarity can compare a name aspect). Optionally, one or more similarity rules can specify a standardization function that can be applied to the information specified in records, for instance to remove white spaces, punctuation, and so on. As an example with respect to business names, a standardization function may remove white space. As another example, when comparing business names optionally no standardization function may be applied such that names are directly compared. Optionally, the standardization function can return multiple values (e.g., strings), for instance a standardization function associated with comparing names, can return a name specified in a record both with, and without, a middle name. For example, a first string can concatenate first and last name (e.g., {first/last}), and a second string can concatenate first, middle, last name (e.g., {first/first_letter_of_middle name/last}), and so on. In this way, the name can be compared with, and without, the middle name. Optionally, one or more similarity rules can cause the removal of particular information when comparing records. For instance, in the example of a similarity rule that compares names, the system can automatically remove particular names from being compared (e.g., 'John Doe' may refer to a court-hidden name and may not be actually descriptive of an entity, 'Unknown' or 'Unspecified' can represent that the name is not known, and so on).

The system determines records that match according to each similarity rule (block 404). As described above, each similarity rule can compare particular aspects of an entity, specified in records, to determine records that match according to the similarity rule.

An example of two records as rows in database tables includes:

| ID | First Name | Middle Name | Last Name | Business Name | SSN | EIN | Address | Type |
|---|---|---|---|---|---|---|---|---|
| A1 | John | C. | Doe | Business1 | 123-45-6789 | 111-111-111 | Address1 | Individual |
| A2 | Nancy | M. | Doe | Business2 | 000-00-0000 | 555-555-5555 | Address2 | Individual + Business |

For an example similarity rule in which name, address, and social security number, are to be exactly compared, the system can generate a table of similarity keys for use in determining matching records:

| ID | Similarity Key | Type |
|---|---|---|
| 1 | JohnCDoe\|Address1\|6789 | Individual |
| 1 | JohnDoe\|Address1\|6789 | Individual |
| 2 | Business2\|Address2\|5555 | Business |
| 2 | NancyMDoe\|Address2\|0000 | Individual |
| 2 | NancyDoe\|Address2\|0000 | Individual |

The above-included table includes a unique identifier of each record, along with aspects specified in each record, such as for a first record (e.g., record A1) a name of an entity, an address of the entity, and the last four digits of a social security number of the entity (e.g., the full social security number may be used, or no social security number may be used, or the number may be obfuscated or otherwise modified before presentation to a reviewing user as illustrated in FIGS. 5-10). As described above, a name of an individual can be matched on a first name and last name, and also with and without a middle name. Since records stored in particular data sets may only include first and last name, and not middle name, the system can advantageously ensure that names with, and without, middle are compared. While the example above illustrates names being capitalized, it should be understood that this is a non-limiting example and that, for example, a standardization process may cause all names to be lowercase.

Thus, as illustrated in the table, the first record is identified twice (e.g., a name with and without a middle name). Additionally, since the type of entity is indicated as being an individual, when the similarity key is being generated, the system can utilize an ontology to obtain aspects particular to the individual type of entity. Therefore, "JohnCDoe" is obtained, in contrast to the business name of "Business 1." Similarly, since a second record (e.g., record A2) is indicated as being an individual+business, the system generates similarity keys for both an individual and a business type of entity. Therefore, the system (e.g., using an ontology) obtains, for a first similarity key, a name of the entity as the business name, an address as a business address, and a social security number as the EIN number. The remaining two similarity keys for the entity are then generated based on an individual type of entity, and the individual's name (e.g., with and without middle name) are utilized.

The system merges the table of similarity keys on itself, and obtains a table that indicates which of the IDs match (e.g., the system can ensure that similarity keys of a same type of entity are only matched). Since, as described above, the table of similarity keys includes a unique identifier of each record, the system can utilize the unique identifiers to determine which records satisfy the similarity rule.

While the above description can be utilized for similarity rules that require exact matches, the system performs similarity rules that allow for fuzzy matching differently. Since fuzzy matching requires the system to perform additional computations, such as computing one or more distance functions (e.g., Levenshtein distance) or performing one or more processes (e.g., the system can compare names, addresses, and so on, using phonetic algorithms), the system can initially perform one or more similarity rules that require exact matches to reduce the pool of potential matches. That is, the system can perform the above-described similarity rule that matches name, address, and social security number, and upon determining that two records match, can then not perform fuzzy matching on the two records. As described below, with respect to step 406, the system can match records according to a matching rule that indicates records as matching based on satisfaction of one or more similarity rules that utilize exact matching. Afterwards, the system can perform fuzzy matching.

Additionally, the system can perform fuzzy matching between records that are determined to satisfy at least one similarity rule that requires exact matching. For example, the system can initially determine records that specify addresses which exactly match, or specify social security numbers (e.g., last four digits) which exactly match. The system can then perform fuzzy matching between these determined records, such as determining distance functions on names specified in the records.

Using the similarity rules, the system obtains records determined to satisfy one or more of the rules, and then determines records that are to be indicated as matching (e.g., for review by a reviewing user as will be described in FIGS. 5-10).

The system determines records that are indicated as matching according to one or more matching rules (block 406). The system can store, or receive (e.g., from a user), information specifying similarity rules that are to be satisfied before records are indicated as matching. For instance, particular similarity rules may be detailed enough such that mere satisfaction of a single similarity rule may be sufficient for records to be indicated as matching (e.g., a similarity rule specifying name, address, social security number). Additionally, for records to be indicated as matching, a threshold number of less detailed similarity rules may need to be satisfied.

As an example, the system can determine records that specify at least one aspect that exactly matches (e.g., names exactly match, addresses exactly match, social security numbers exactly match, phone numbers exactly match, email addresses exactly match, and so on). The system can then indicate that a portion of the determined records are to be indicated as matching, if the portion satisfies one or more other similarity rules (e.g., fuzzy matches, exact matches on one or more other aspects).

A non-limiting example can include: determining that two records are to be indicated as matching if (1) the two records specify names that exactly match, and (2) the two records specify addresses that fuzzily match or (1) the two records specify addresses that exactly match, and (2) the two records specify names that fuzzily match.

When a reviewing user views bundles of records indicated as matching, the reviewing user can optionally request a description of each satisfied similarity rule. In this way, the reviewing user can quickly focus in on reasons why the system determined the records to match.

Furthermore, a first group of records may be matched according to satisfying a similarity rule associated with exactly matching a particular aspect (e.g., the first group of records exactly share a same name), while a second group of records may be connected to the first group of records by virtue of satisfying a fuzzy matching rule (e.g., the second group of records may specify names that fuzzily match the first group of records). Since this connection falls out of the fuzzy matching, optionally the system may graphically present information indicating the arrangement of the records. That is, the system can present a first group of nodes, representing records included in the first group, connected to each other, and a single connection from one of the nodes to a second group of nodes, representing records included in the second group. A reviewing user can then determine whether the fuzzy match is valid, and if not, the second group of records can be indicated as not being valid matches.

FIG. 5 illustrates an example user interface 500 for viewing bundles that are to be reviewed. As described above, with respect to FIG. 1, the user interface 500 can be viewed by a reviewing user who can confirm that records included in bundles are properly matched.

The user interface 500 includes selectable options 502 associated with reviewing matches determined by the system (e.g., the record determination system 100), and the reviewing user has selected "Status," indicating that the reviewing user wishes to review bundles. Additionally, the user interface 500 includes selectable options 504 associated with a status of each bundle, including "Needs Further Review" (e.g., an option indicating that associated bundles have been specified by a reviewing user as needing additional review), "Completed" (e.g., an option indicating that associated bundles have been reviewed), "Unmatchable" (e.g., an option, that when selected, causes the user interface 500 to present records that are unable to be matched), "Unreviewed" (e.g., an option indicating that associated bundles have not been reviewed by a reviewing user). As illustrated, the reviewing user has selected option "Unreviewed," and indications of bundles that need review are presented.

The unreviewed bundles are presented in a list 506, and specify a unique identifier associated with each bundle, a number of records included in the bundle, a reviewer that has been assigned to review the bundle, data sets from which records were obtained 508, and selectable options to edit (e.g., review) each bundle.

Upon user selection of a particular bundle, the user interface 500 can update to describe records included in the bundle, as described above and illustrated in FIG. 1.

FIG. 6 is an example user interface 600 illustrating detailed information specified in a particular record. As described above, with respect to FIG. 1, a reviewing user can select a particular record (e.g., record 2A) and view detailed information specified in the particular record. That is, when reviewing records to confirm that the records match, the system may present summary information associated with each record (e.g., name, address, social security number), and not present other information (e.g., ID numbers, and so on as listed). For example, a presentation of the particular record, such as record 2A, can be interactive. The reviewing user can interact with the presentation to request detailed information related to the particular record. As an example, the reviewing user can interact with the textual description "Data Set 1," and upon interaction, user interface 600 can be presented. Using user interface 600, the reviewing user can view detailed information that can be obtained from information stored or maintained by the system (e.g., in one or more databases).

Figure 7:
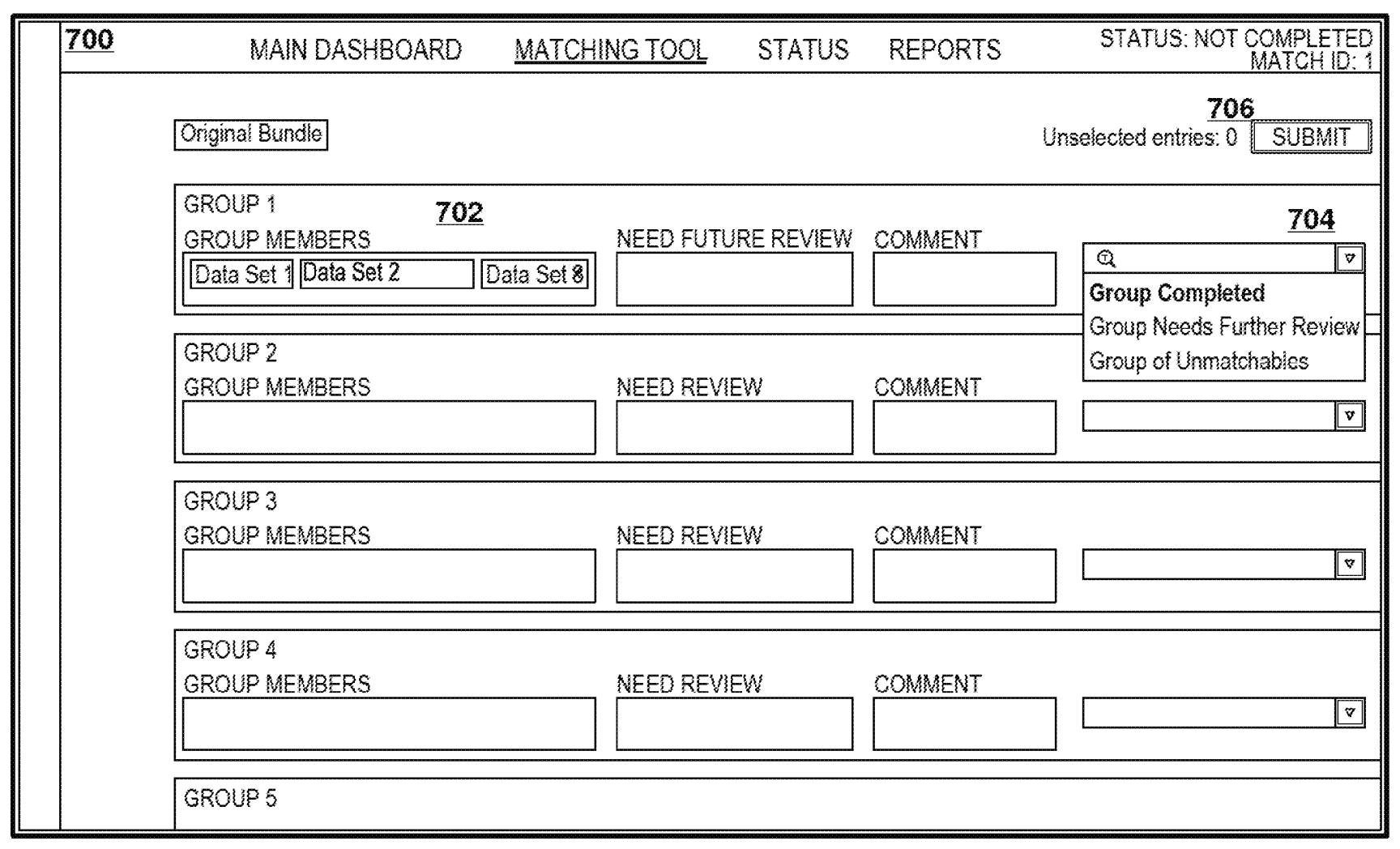

FIG. 7 is an example user interface 700 for confirming records in a bundle. As illustrated in FIG. 1, the reviewing user can view summary information of records determined to be included in a bundle, and can confirm that the records are correctly matched. Using user interface 700, the reviewing user can indicate that the records (e.g., records 2A-2C, obtained from data sets 4A-4C) are correctly matched. That is, the reviewing user can specify that the records belong to a same group 702, and can indicate that the group is completed 704, confirming the matches. Additional options includes the reviewing user specifying that the matches need further review or that the matches are unmatchable. The reviewing user can include textual information describing the matches for a subsequent reviewing user to read.

Figure 8:
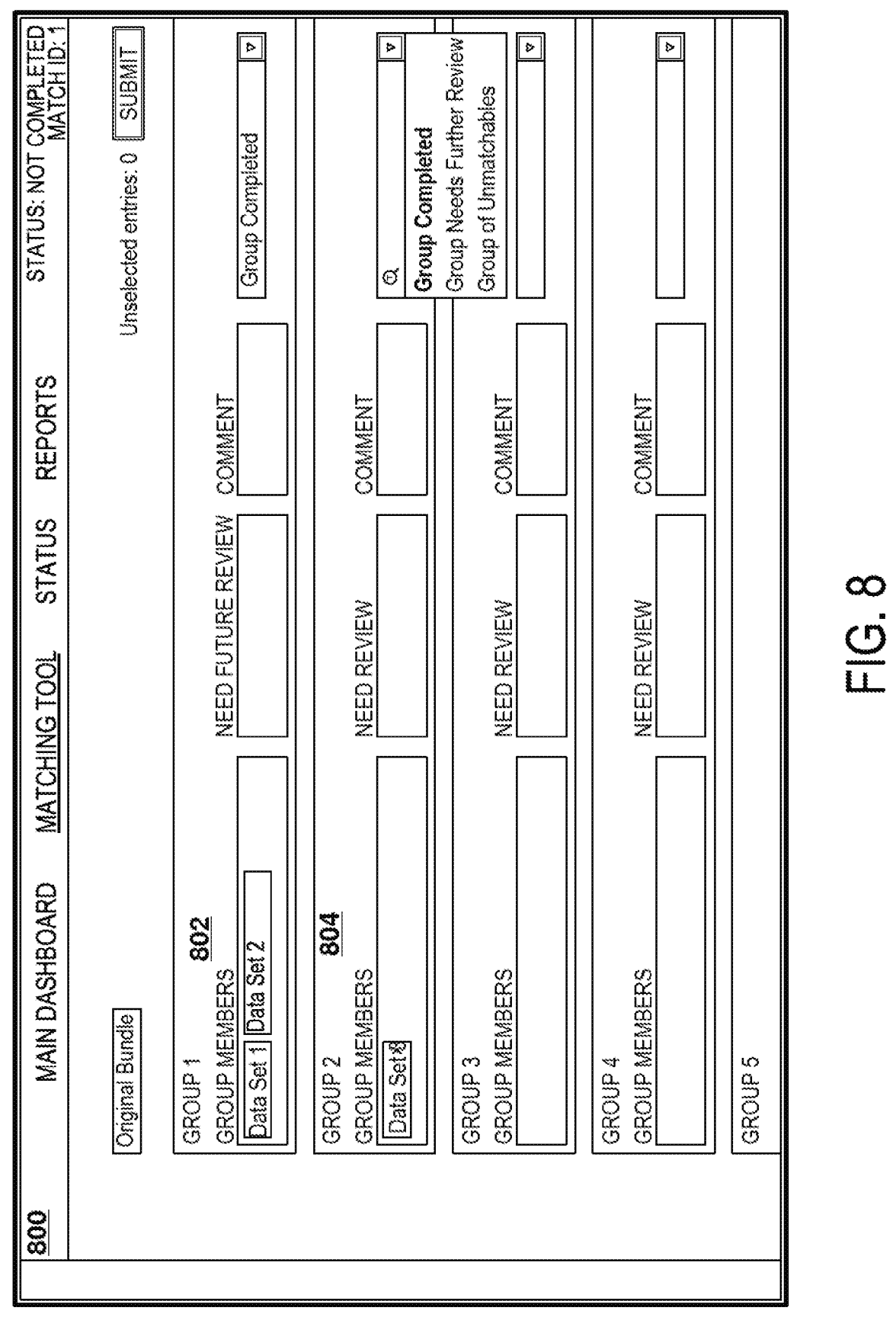

FIG. 8 is another example user interface 800 for confirming records in a bundle. In contrast to FIG. 7, the reviewing user can indicate that a particular record is to be in a separate group 804 than the remaining records 802. In this way, the reviewing user can indicate that a record indicated, by the system, as matching other records, is not a match (e.g., a false positive).

FIG. 9 is an example user interface 900 graphically representing records that have been confirmed to match. The user interface 900 can be presented, for instance, upon the reviewing user confirming records that match, and/or records that do not match (e.g., as illustrated in FIG. 8).

With respect to the reviewing user confirming that the records do not match, the user interface 900 can graphically depict which records match and which do not. For example, as illustrated in FIG. 8 the reviewing user has indicated that records 902, 904, match, while record 906 does not match. Upon indication, user interface 900 can be presented (e.g., automatically, or based on a user request) illustrating the records 902, 904, 906.

User interface 900 therefore includes three records, with a first record 902 confirmed to match a second record 904, while a third record 906 has been confirmed not to match. The user interface 900 can indicate that the first and second records match (e.g., the records can be shaded a same color, a background can be a same pattern, text can indicate that they match, the borders can be increased in size as illustrated, and so on), while indicating that the third record 906 does not match. For example, record 906 can be outlined in a distinct color, the record 906 can flash, include textual descriptions indicating it's non-matching status, and so on.

In this way, the reviewing user can quickly review that records included in the bundles have been correctly matched.

Additionally, and as described above with respect to FIG. 2, as new information is included for matching, such as new data sets, the user interface 900 can present indications of records that were previously confirmed to match, along with a new record from a new data set that is indicated, by the system, as matching (e.g., potentially matching). The reviewing user can then confirm or deny that the new record is to be included in the bundle.

Figure 10:
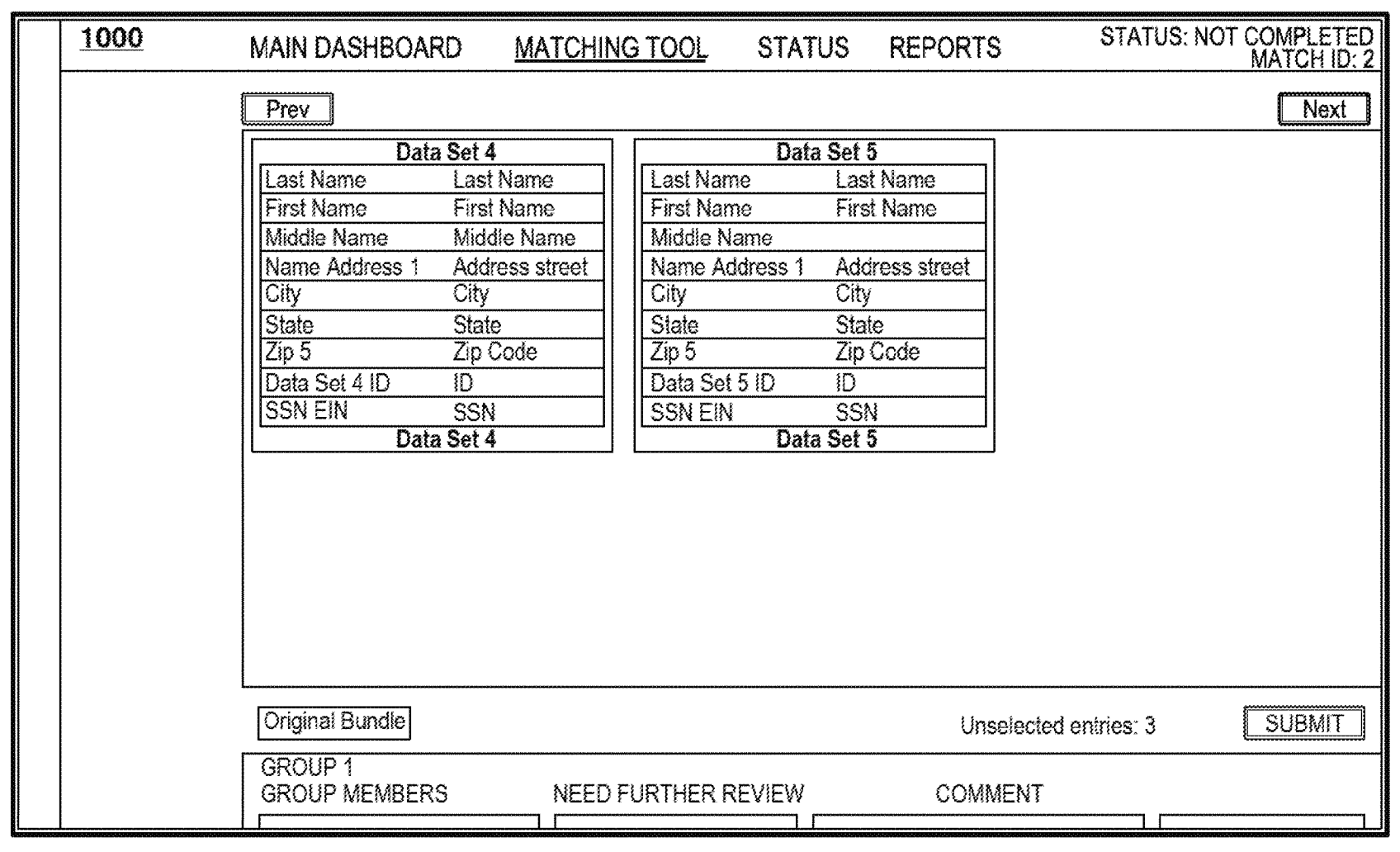

FIG. 10 is an example user interface 1000 for confirming matched records in a particular bundle. After the reviewing user reviews the bundle illustrated in FIG. 1, the reviewing user can interact with the user interface 10 to view a subsequent bundle. FIG. 10 includes information specified in records that have been indicated, by the system, as matching.

Furthermore, user interfaces can be generated that enable a reviewing user to manually search through all of the records, datasets, and so on, that are accessible to the record determination system 100. For example, the user interfaces can include interactive elements associated with filtering records, such as specifying particular datasets of interest, specifying portions of an entity's name, and so on. The reviewing user can utilize the user interface to locate records that are otherwise unmatchable. For example, the reviewing user can obtain information indicating that an entity has an alias. This use of the alias (e.g., a distinct name) may cause records associated with a same entity to not be matched. For example, one or more records may specify the entity's name, while one or more other records may specify the alias. The reviewing user can therefore utilize the user interfaces to search for this alias, and then cause records to be matched (e.g., merged). For example, the reviewing user can group these records together, for example as described above with respect to FIGS. 1 and 7.

In addition to using the user interfaces to search for records, the reviewing user can optionally update a similarity rule to specify the alias. As described above, this updated similarity rule can cause unmatched records to be compared, and therefore a first record indicating a particular name, and a second record indicating the associated alias, can be merged.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
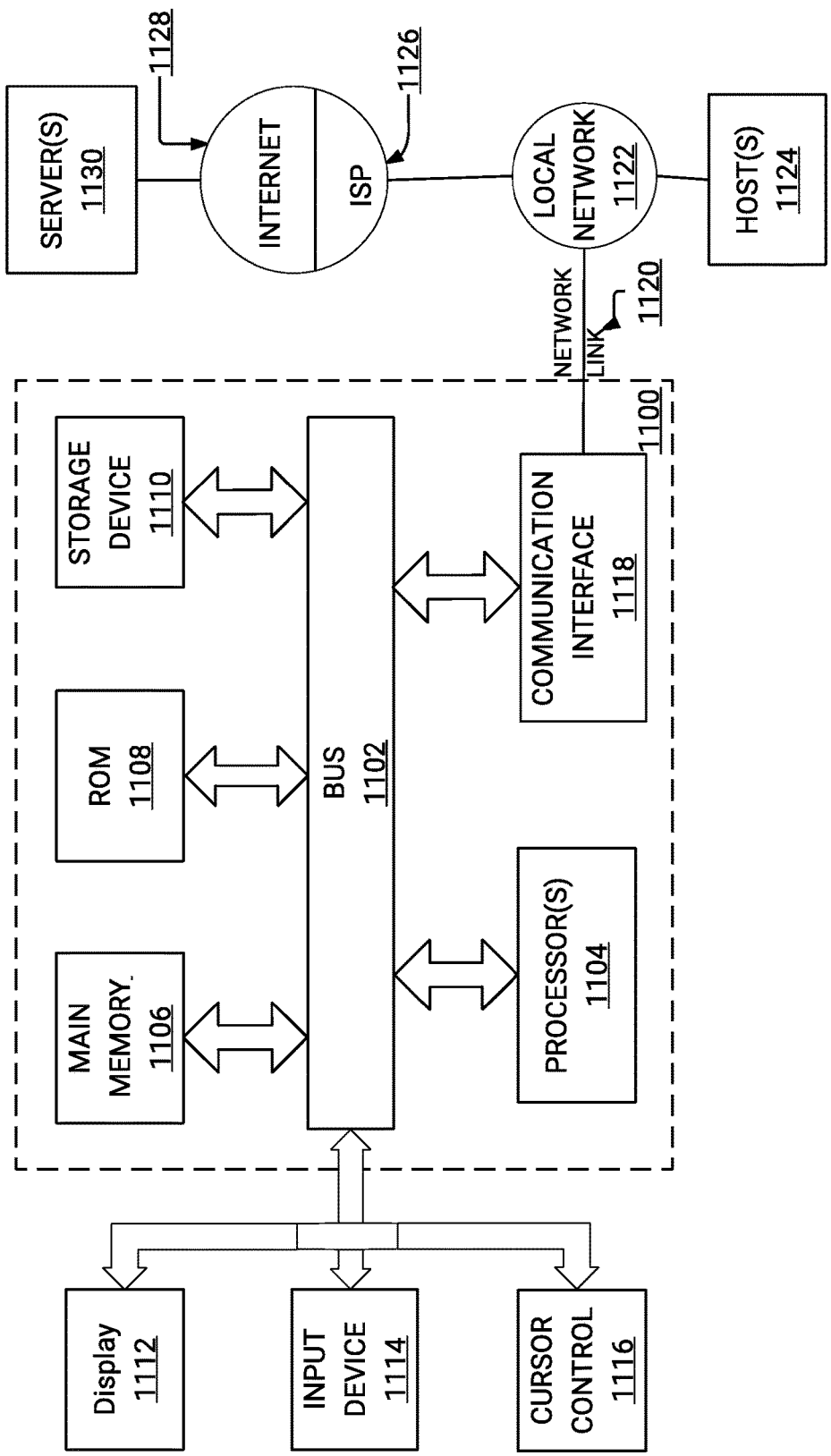
FIG. 11 is a block diagram that illustrates a computer system upon which various embodiments may be implemented.

For example, FIG. 11 is a block diagram that illustrates a computer system 1100 upon which various embodiments may be implemented. The example computer system 1100 can, in some embodiments, be the record determination system 100. Additionally, in some embodiments, the record determination system 100 can be a combination of multitudes of computer systems 1100 networked together or otherwise in communication with each other. Computer system 1100 includes a bus 1102 or other communication mechanism for communicating information, and a hardware processor, or multiple processors, 1104 coupled with bus 1102 for processing information. Hardware processor(s) 1104 may be, for example, one or more general purpose microprocessors.

Computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

Computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1100 may include a user interface module to implement a GUI that may be stored in a mass storage device as computer executable program instructions that are executed by the computing device(s). Computer system 1100 may further, as described below, implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more computer readable program instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicate with a WAN). Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others.

The scope of certain inventions disclosed herein is indicated by the appended claims rather than by the foregoing description. All changes which come within the meaning and range of equivalency of the claims are to be embraced within their scope.

What is claimed is:

1. A method comprising:
by a system comprising one or more processors,
obtaining a plurality of data sets comprising a plurality of records associated with entities, the records each specifying information for a plurality of aspects of an entity, wherein the information is encoded in the records, for each of the data sets, according to a respective format;
determining one or more bundles from the plurality of data sets, each bundle indicating a respective subset of the records which are determined to be associated with a same entity, wherein the bundles are determined based on one or more similarity rules that compare one or more aspects specified in the records, and wherein the aspects are obtained using ontologies associated with the data sets that enable access to the respective formats,
wherein determining the one or more bundles is based on performing similarity rules associated with exact matching and fuzzy matching, and wherein fuzzy matching between a first record and second records included in the remaining of the plurality of records is performed upon satisfaction of one or more similarity rules associated with exact matching between the first record and the second records;
providing, for presentation to a user via a user interface, information associated with a particular bundle of the one or more bundles, the information describing the subset of the records indicated by the particular bundle;
receiving, from the user, selections confirming that one or more records of the subset match with the same entity and confirming that a different record of the subset does not match with the same entity; and
updating the particular bundle based on the selections, wherein the user interface is updated to present graphical representations of summary information associated with the one or more records and the different record, wherein the user interface adjusts respective graphical representation of the summary information to indicate that the one or more records match and that the different record does not match.

2. The method of claim 1, wherein the aspects include one or more of a name, an address, or a social security number.

3. The method of claim 1, wherein a particular ontology associated with a particular data set indicates respective columns included in the particular data set that are to be accessed for each aspect.

4. The method of claim 1, wherein determining bundles comprises:
accessing information associated with one or more matching rules, each matching rule indicating that upon determining one or more records satisfy one or more similarity rules, the one or more records are to be indicated as matching;
performing a plurality of similarity rules using the records, and determining, based on the similarity rules, records that satisfy at least one matching rule; and
generating bundles indicating records that satisfy at least one matching rule.

5. The method of claim 4, wherein performing a particular similarity rule associated with exact matching comprises:
generating, based on the aspects associated with the particular similarity rule, a plurality of similarity keys associated with respective records, the similarity keys generated from information specified in the records that are associated with the aspects;
performing one or more operations to compare the similarity keys, the comparison requiring that the similarity keys exactly matching; and
determining records associated with similarity keys that satisfy the particular similarity rule.

6. The method of claim 4, wherein a particular matching rule indicates satisfaction upon two records associated with a first aspect that exactly match and a second aspect that fuzzily match.

7. The method of claim 6, wherein a second similarity rule comparing the second aspect is performed subsequent to a first similarity rule comparing the first aspect, and wherein the second similarity rule is performed using records that satisfy the first similarity rule.

8. The method of claim 1, wherein fuzzy matching comprises determining a Levenshtein distance.

9. A system comprising one or more computers and one or more computer storage media storing instructions that when executed by the one or more computers, cause the one or more computers to perform operations comprising:
obtaining a plurality of data sets comprising a plurality of records associated with entities, the records each specifying information for a plurality of aspects of an entity, wherein the information is encoded in the records, for each of the data sets, according to a respective format;
determining one or more bundles from the plurality of data sets, each bundle indicating a respective subset of the records which are determined to be associated with a same entity, wherein the bundles are determined based on one or more similarity rules that compare one or more aspects specified in the records, and wherein the aspects are obtained using ontologies associated with the data sets that enable access to the respective formats,
wherein determining the one or more bundles is based on performing similarity rules associated with exact matching and fuzzy matching, and wherein fuzzy matching between a first record and second records included in the remaining of the plurality of records is performed upon satisfaction of one or more similarity rules associated with exact matching between the first record and the second records;
providing, for presentation to a user via a user interface, information associated with a particular bundle of the one or more bundles, the information describing the subset of the records indicated by the particular bundle;
receiving, from the user, selections confirming that one or more records of the subset match with the same entity and confirming that a different record of the subset does not match with the same entity; and
updating the particular bundle based on the selections, wherein the user interface is updated to present graphical representations of summary information associated with the one or more records and the different record, wherein the user interface adjusts respective graphical representation of the summary information to indicate that the one or more records match and that the different record does not match.

10. The system of claim 9, wherein the aspects include one or more of a name, an address, or a social security number.

11. The system of claim 9, wherein a particular ontology associated with a particular data set indicates respective columns included in the particular data set that are to be accessed for each aspect.

12. The system of claim 9, wherein determining bundles comprises:
  accessing information associated with one or more matching rules, each matching rule indicating that upon determining one or more records which satisfy one or more similarity rules, the one or more records are to be indicated as matching;
  performing a plurality of similarity rules using the records, and determining, based on the similarity rules, records that satisfy at least one matching rule; and
  generating bundles indicating records that satisfy at least one matching rule.

13. The system of claim 12, wherein performing a particular similarity rule associated with exact matching comprises:
  generating, based on the aspects associated with the particular similarity rule, a plurality of similarity keys associated with respective records, the similarity keys generated from information specified in the records that are associated with the aspects;
  performing one or more operations to compare the similarity keys, the comparison requiring that the similarity keys exactly matching; and
  determining records associated with similarity keys that satisfy the particular similarity rule.

14. The system of claim 12, wherein a particular matching rule indicates satisfaction upon two records associated with a first aspect that exactly match and a second aspect that fuzzily match.

15. The system of claim 14, wherein a second similarity rule comparing the second aspect is performed subsequent to a first similarity rule comparing the first aspect, and wherein the second similarity rule is performed using records that satisfy the first similarity rule.

16. A computer storage media storing instructions that when executed by a system of one or more computers, cause the one or more computers to perform operations comprising:
  obtaining a plurality of data sets comprising a plurality of records associated with entities, the records each specifying information for a plurality of aspects of an entity, wherein the information is encoded in the records, for each of the data sets, according to a respective format;
  determining one or more bundles from the plurality of data sets, each bundle indicating a respective subset of the records which are determined to be associated with a same entity, wherein the bundles are determined based on one or more similarity rules that compare one or more aspects specified in the records, and wherein the aspects are obtained using ontologies associated with the data sets that enable access to the respective formats,
  wherein determining the one or more bundles is based on performing similarity rules associated with exact matching and fuzzy matching, and wherein fuzzy matching between a first record and second records included in the remaining of the plurality of records is performed upon satisfaction of one or more similarity rules associated with exact matching between the first record and the second records;
  providing, for presentation to a user via a user interface, information associated with a particular bundle of the one or more bundles, the information describing the subset of the records indicated by the particular bundle;
  receiving, from the user, selections confirming that one or more records of the subset match with the same entity and confirming that a different record of the subset does not match with the same entity; and
  updating the particular bundle based on the selections, wherein the user interface is updated to present graphical representations of summary information associated with the one or more records and the different record, wherein the user interface adjusts respective graphical representation of the summary information to indicate that the one or more records match and that the different record does not match.

17. The computer storage media of claim 16, wherein determining bundles comprises:
  accessing information associated with one or more matching rules, each matching rule indicating that upon determining one or more records satisfy one or more similarity rules, the one or more records are to be indicated as matching;
  performing a plurality of similarity rules using the records, and determining, based on the similarity rules, records that satisfy at least one matching rule; and
  generating bundles indicating records that satisfy at least one matching rule.

18. The computer storage media of claim 17, wherein performing a particular similarity rule associated with exact matching comprises:
  generating, based on the aspects associated with the particular similarity rule, a plurality of similarity keys associated with respective records, the similarity keys generated from information specified in the records that are associated with the aspects;
  performing one or more operations to compare the similarity keys, the comparison requiring that the similarity keys exactly matching; and
  determining records associated with similarity keys that satisfy the particular similarity rule.

19. The computer storage media of claim 17, wherein a particular matching rule indicates satisfaction upon two records associated with a first aspect that exactly match and a second aspect that fuzzily match.

20. The computer storage media of claim 19, wherein a second similarity rule comparing the second aspect is performed subsequent to a first similarity rule comparing the first aspect, and wherein the second similarity rule is performed using records that satisfy the first similarity rule.

* * * * *